(12) United States Patent
Ogawa et al.

(10) Patent No.: US 7,116,218 B2
(45) Date of Patent: Oct. 3, 2006

(54) VEHICLE-TIRE-STATE DETECTION/COMMUNICATION APPARATUS AND TIRE-DATA COMMUNICATION APPARATUS

(75) Inventors: Atsushi Ogawa, Toyota (JP); Takashi Doi, Toyota (JP); Masaaki Tabata, Chiryu (JP); Hldeki Kusunoki, Nishikamo-gun (JP); Kazuhisa Meguro, Toyota (JP); Shinichi Tomioka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 535 days.

(21) Appl. No.: 10/397,206

(22) Filed: Mar. 27, 2003

(65) Prior Publication Data

US 2003/0197604 A1    Oct. 23, 2003

(30) Foreign Application Priority Data

Apr. 22, 2002    (JP) .............................. 2002-119633

(51) Int. Cl.
*B60C 23/00* (2006.01)

(52) U.S. Cl. ...................... 340/447; 340/442; 340/445; 340/449; 340/451; 73/1.44; 73/1.57; 73/1.59; 73/146

(58) Field of Classification Search ................ 340/442, 340/445, 447, 449, 451; 73/1.44, 1.57, 1.59, 73/146
See application file for complete search history.

(56) References Cited

U.S. PATENT DOCUMENTS 5,838,229 A    11/1998  Robinson, III
6,034,597 A *  3/2000   Normann et al. ........... 340/447
6,087,930 A *  7/2000   Kulka et al. ................. 340/447
6,252,498 B1*  6/2001   Pashayan, Jr. ............... 340/447
6,441,728 B1*  8/2002   Dixit et al. .................. 340/447
6,571,617 B1*  6/2003   Van Niekerk et al. ........ 73/146
6,731,205 B1*  5/2004   Schofield et al. ........... 340/444
6,897,775 B1*  5/2005   Elsner et al. .......... 340/539.22

FOREIGN PATENT DOCUMENTS

| DE | 196 52 365 C1 | 4/1998 |
| JP | A 8-505939 | 6/1996 |
| JP | A 10-104103 | 4/1998 |
| JP | A 11-20427 | 1/1999 |
| JP | A 11-20428 | 1/1999 |
| JP | A 2000-203221 | 7/2000 |
| JP | A 2000-238515 | 9/2000 |
| JP | A 2001-105811 | 4/2001 |
| WO | WO 00/34062 | 6/2000 |

\* cited by examiner

*Primary Examiner*—Jeffery Hofsass
*Assistant Examiner*—Samuel J. Walk
(74) *Attorney, Agent, or Firm*—Oliff & Berridge, PLC

(57) ABSTRACT

A detection/communication apparatus to be installed on a vehicle having a plurality of tires. The apparatus includes: (a) tire state detectors which are provided on the respective tires and each of which detects a state of a corresponding one of the tires; (b) local transceivers which are provided on the respective tires and which transmit tire data sets relating to the respective tires; (c) a central receiver which is provided on a vehicle body and which receives the tire data sets transmitted by the local transceivers; (d) a particular-signal transmitter which is provided on the vehicle body and which transmits a particular signal; and (e) data-transmission modifiers which are provided on the respective tires. Each of the data-transmission modifiers is operable depending upon a state of reception of the particular signal by a corresponding one of the local transceivers, to modify transmission of a corresponding one of the tire data sets by the corresponding one of the local transceivers.

23 Claims, 15 Drawing Sheets

T-TYPE-TIRE DATA SET

(a) HEADER DATA (b) SYNCHRONIZATION DATA (c) IDENTIFICATION DATA (d) BATTERY VOLTAGE DATA (f) AIR PRESSURE DATA (k) T-TYPE TIRE DETERMINATION DATA

VEHICLE-TIRE-STATE DETECTION/COMMUNICATION APPARATUS AND TIRE-DATA COMMUNICATION APPARATUS

This application is based on Japanese Patent Application No. 2002-119633 filed in Apr. 22, 2002, the content of which is incorporated hereinto by reference.

BACKGROUND OF THE INVENTION

1. Field of the Invention

The present invention relates to a detection/communication apparatus for detecting a state of each vehicle tire such as its air pressure and temperature, and transmitting data representative of the tire state from a radio transmitter provided on each tire to a receiver provided on a vehicle body. More particularly, the invention is concerned with techniques for making it possible to distinguish a non-mounted tire from other tires mounted on axles of the vehicle, without a particular operation by a vehicle operator.

2. Discussion of Related Art

JP-A-2000-203221 discloses a spare-tire air-pressure monitoring apparatus in which a transponder is provided within an air chamber of a spare tire so that an air pressure of the spare tire can be monitored. The transponder has an air pressure sensor for detecting the air pressure, an integrated circuit including a data storage for storing data representative of the detected air pressure, and a power source in the form of a storage battery. The transponder, covered with an elastic member such as a resin so as to be protected from being damaged, is adapted to transmit the stored data in response to a data-requesting signal transmitted from an external device to the transponder.

In the spare-tire air-pressure monitoring apparatus disclosed in the Japanese publication, it is possible to monitor or obtain the data representative of the air pressure of the spare tire, without requiring a vehicle operator to perform a particular operation. However, the transponder is inevitably moved within the air chamber of the spare tire during running of the vehicle, so that the movement of the transponder contributes to a vibration of the vehicle body.

SUMMARY OF THE INVENTION

It is therefore an object of the present invention to obtain information relating to the vehicle tires in such a manner that makes the information of the non-mounted tire distinguishable or separable from the information of the mounted tire, without requiring the vehicle operator to perform a particular operation, and without using an arrangement that would induce a vibration of the vehicle body. This object may be achieved by a detection/communication apparatus or a communication apparatus constructed according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A detection/communication apparatus to be installed on a vehicle having a plurality of tires, the apparatus comprising:

tire state detectors which are provided on the respective tires and each of which detects a state of a corresponding one of the tires;

local transceivers which are provided on the respective tires and which transmit tire data sets relating to the respective tires, each of the tire data sets including at least one tire-state data element representative of the detected state of a corresponding one of the tires;

a central receiver which is provided on a body of the vehicle and which receives the tire data sets transmitted by the local transceivers;

a particular-signal transmitter which is provided on the body of the vehicle and which transmits a particular signal; and data-transmission modifiers which are provided on the respective tires, each of the data-transmission modifiers being operable depending upon a state of reception of the particular signal by a corresponding one of the local transceivers, to modify transmission of a corresponding one of the tire data sets by the corresponding one of the local transceivers.

In the detection/communication apparatus of this mode (1) of the present invention, the particular signal may be receivable by only a selected one of the local transceivers, as in an apparatus of mode (2) described below, or alternatively, may be receivable by two or more of the local transceivers. In the latter case, each of the data-transmission modifiers may be activated, for example, if a voltage value of the particular signal received by the corresponding local transceiver is substantially constant rather than being changeable. In this arrangement, the data-transmission modifier provided on a non-mounted tire is activated, since the voltage value of the particular signal received by the local transceiver provided on the non-mounted tire is substantially constant owing to an unchangeable distance between the local transceiver and the particular-signal transmitter even during running of the vehicle. On the other hand, the data-transmission modifier provided on a mounted tire is not activated, since the voltage value of the particular signal received by the local transceiver provided on the mounted tire is periodically changeable due to a periodically changeable distance between the local transceiver and the particular-signal transmitter during rotation of the tired wheel, i.e., during running of the vehicle.

(2) A detection/communication apparatus according to mode (1), wherein the particular-signal transmitter transmits the particular signal such that the particular signal is receivable by one of the local transceivers that is provided on a selected one of the tires, while the particular signal is unreceivable by the other of the local transceivers, and wherein a corresponding one of the data-transmission modifiers which is provided on the selected one of the tires is operated in response to reception of the particular signal by the one of the local transceivers, to modify transmission of a corresponding one of the tire data sets by the one of the local transceivers.

In the detection/communication apparatus of this mode (2) of the present invention, the particular-signal transmitter may be disposed in the vicinity of a space in which the non-mounted tire is stored, so that the particular signal transmitted by the particular-signal transmitter can be received by one of the local transceivers that is provided on the non-mounted tire. In this arrangement, one of the data-transmission modifiers that is provided on the non-mounted tire is activated in response to the reception of the particular signal by the local transceiver provided on the non-mounted tire, to modify the transmitting manner in which the local transceiver provided on the non-mounted tire transmits the corresponding one of the tire data sets as a non-mounted-tire data set relating to the non-mounted tire. Thus, the non-mounted-tire data set is distinguishable from the mounted-tire data set after the transmissions of the tire data sets to the central receiver. It is noted that the particular signal may be referred also to as a modification requesting signal.

(3) A detection/communication apparatus according to mode (1) or (2), wherein each of the data-transmission modifiers includes a transmission restrictor operable to restrict transmission of the corresponding one of the tire data sets by the corresponding one of the local transceivers.

In the detection/communication apparatus of this mode (3) of the present invention, the particular signal transmitted by the particular-signal transmitter may be adapted to be received by one of the local transceivers that is provided on the non-mounted tire, so that the transmission of the tire data set by the local transceiver provided on the non-mounted tire is restricted, for example, by reducing a number of transmissions of the tire data set within a predetermined length of time, or alternatively by inhibiting the transmission of the tire data set. In the former case, the tire data set relating to the non-mounted tire is transmitted at a relatively long time interval while the tire data set relating to the mounted tire is transmitted at a relatively short time interval. In the latter case, the tire data set relating to the non-mounted tire is not transmitted at all while the tire data set relating to the mounted tire is transmitted. In either of these cases, it is possible to reduce consumption of an electric energy generated by a battery as a power source of the tire state detector and the local transceiver provided on the non-mounted tire. Further, in the latter case, it is possible to prevent activation of a warning device or unnecessary control of the vehicle which is based on the state of the non-mounted tire such as its air pressure and temperature of the non-mounted tire.

(4) A detection/communication apparatus according to any one of modes (1)–(3), wherein each of the data-transmission modifiers includes a data-element content changer operable to change a content of a data element included in the corresponding one of the tire data sets that is transmitted by the corresponding one of the local transceiver, such that the changed content of the data element included in the corresponding one of the tire data sets is different from that of the data element included in the other of the tire data sets.

In the detection/communication apparatus of this mode (4) of the present invention, the particular signal transmitted by the particular-signal transmitter may be adapted to be received by one of the local transceivers that is provided on the non-mounted tire, so that the content of the data element of the tire data set relating to the non-mounted tire is changed, for example, so as to have an indication that the tire data set relates to the non-mounted tire. Owing to such an indication, the tire data set relating to the non-mounted tire is distinguishable from the tire data set relating to the mounted tire. It is preferable that the air pressure, temperature or other state of the non-mounted tire as well as that of the mounted tire is monitored so that an abnormality of the state of the non-mounted tire as well as an abnormality of the state of the mounted tire can be informed to the vehicle operator or a vehicle controller disposed in the vehicle body. In this case, a reference value to be used for checking a tire-state-related value (e.g., an air pressure value and a temperature) of the non-mounted tire is preferably different from that to be used for checking a tire-state-related value of the mounted tire. Further, a procedure required in the event of an abnormality of the state of the non-mounted tire is preferably different from that required in the event of an abnormality of the state of the mounted tire. In this respect, the arrangement enabling the non-mounted-tire data set and the mounted-tire data set to be distinguishable from each other is significant. It is noted that the apparatus of this mode (4) may include, in addition to the data-element content changer, the above-described transmission restrictor, so that the non-mounted-tire data set can be more reliably identifiable among the tire data sets. In this arrangement, the transmission restrictor limits the transmission of the non-mounted-tire data set but does not completely inhibit the transmission of the non-mounted-tire data set.

(5) A detection/communication apparatus according to any one of modes (1)–(4), wherein each of the data-transmission modifier includes a data-amount changer operable to change a data amount of the corresponding one of the tire data sets that is transmitted by the corresponding one of the local transceivers, such that the changed data amount of the corresponding one of the tire data sets is different from that of the other of the tire data sets.

In the detection/communication apparatus of this mode (5) of the present invention, the particular signal transmitted by the particular-signal transmitter may be adapted to be received by one of the local transceivers that is provided on the non-mounted tire, so that the data amount of the non-mounted-tire data set is changed by the data-amount changer so as to be smaller than that of the mounted-tire data set. Although it is preferable that the state of the non-mounted tire as well as that of the mounted tire is preferably informed to the vehicle operator or the vehicle controller, it is common that the data amount of the non-mounted-tire-data set may be smaller than that of the mounted-tire data set. In this arrangement, the data-amount changer may be referred to as a data-amount reducer. The data-amount changer or reducer contributes not only to the distinction of the non-mounted-tire data set from the mounted-tire data set but also to reduction of consumption of the electric energy generated by the power source of the local transceiver provided on the non-mounted tire.

(6) A detection/communication apparatus according to any one of modes (1)–(5), wherein each of the data-transmission modifiers includes a transmission-interval changer operable to change a time interval at which the corresponding one of the tire data sets is transmitted by the corresponding one of the local transceivers, such that the changed time interval is different from a time interval of transmission of the other of the tire data sets.

In the detection/communication apparatus of this mode (6) of the present invention, the particular signal transmitted by the particular-signal transmitter may be adapted to be received by one of the local transceivers that is provided on the non-mounted tire, so that the time interval of the transmission of the non-mounted-tire data set is changed by the transmission-interval changer so as to be different from the time interval of the transmission of the mounted-tire data set. Owing to the difference in the time interval of the transmission, the non-mounted-tire data set can be distinguishable from the mounted-tire data set, even without the above-described data-amount changer. However, the apparatus of this mode (6) may include, in addition to the transmission-interval changer, the data-amount changer, so that the non-mounted-tire data set can be more reliably identifiable among the tire data sets.

(7) A detection/communication apparatus according to any one of modes (1)–(6), further comprising:

a data processor which is provided on the body of the vehicle and which is capable of determining whether the transmission of each of the tire data sets has been modified or not, so that the data processor can process each of the tire data sets in one of different processing manners that is selected depending upon whether the transmission of each of the tire data sets has been modified or not.

In the detection/communication apparatus of this mode (7) of the present invention, the data processor processes each tire data set in one of the different processing manners that is selected based on the determination as to whether the transmission of each tire data set has been modified or not. Where the transmission of the non-mounted-tire data set has been modified while the transmission of the mounted-tire data set has not been modified, the non-mounted-tire data set is processed differently from the mounted-tire data set. It is noted that the data processor may be interpreted to include: a transmission-modification detecting portion which effects the determination as to whether the transmission of each tire data set has been modified or not; and a processing modifying portion which modifies a processing manner in which the tire data set, whose transmission has been modified, is processed.

(8) A detection/communication apparatus according to mode (7), wherein the data processor includes a reference-value changing portion which changes a reference value to be used for checking a tire-state-related value represented by each of the above-described at least one tire-state data element of the corresponding one of the tire data sets whose transmission has been modified, such that the changed reference value is different from a reference value to be used for checking a tire-state-related value represented by each of the above-described at least one tire-state data element of the other of the tire data sets whose transmission has not been modified.

In the detection/communication apparatus of this mode (8) of the present invention, the reference value (which is changed by the reference-value changing portion and which is to be compared with the tire-state related value represented by the tire-state data element of the tire data set) may be interpreted also to mean a threshold value or standard value used for determining whether the tire-state-related value is normal or abnormal. A standard or ideal state of the non-mounted tire and that of the mounted tire are not necessarily the same, but can be different from each other. Where the ideal state of the non-mounted tire and that of the mounted tire are different from each other, the reference value to be compared with the tire-state-related value of the non-mounted tire should be different from that to be compared with the tire-state-related value of the mounted tire. In this respect, the arrangement varying the reference value depending upon the determination as to whether the data transmission has been modified or not is significant.

(9) A detection/communication apparatus according to any one of modes (1)–(8), wherein the plurality of tires of the vehicle includes a mounted tire mounted on an axle of the vehicle and a non-mounted tire carried by the vehicle, and wherein the particular-signal transmitter transmits the particular signal such that the particular signal is receivable by one of the local transceivers that is provided on the non-mounted tire while the particular signal is unreceivable by one of the local transceivers that is provided on the mounted tire.

In the detection/communication apparatus of this mode (9) of the present invention in which the particular signal is receivable by only the local transceiver provided on the non-mounted tire, the particular signal may be provided by a simple signal. This is because each of the data-transmitting modifiers can be activated simply in response to reception of the particular signal by the corresponding local transceiver, namely, simply depending upon whether the particular signal has been received by the corresponding local transceiver or not. On the other hand, if the particular signal is receivable by the local transceiver provided on the mounted tire as well as the local transceiver provided on the non-mounted tire, each of the data-transmitting modifiers can determine whether the corresponding tire data set is the non-mounted-tire data set or the mounted-tire data set, by taking account of a detailed state of reception of the particular signal by the corresponding local transceiver. In this case, the particular signal requires to be provided by a complicated signal, so that the reception states in the respective local transceivers are clearly differentiated from each other.

(10) A detection/communication apparatus according to mode (9), wherein the particular-signal transmitter includes a transmitting antenna by which the particular signal is transmitted, and wherein the transmitting antenna has at least one of an output strength and a directivity which enables the particular signal to be received by the one of the local transceivers provided on the non-mounted tire, and which disables the particular signal to be received by the one of the local transceivers provided on the mounted tire.

(11) A detection/communication apparatus to be installed on a vehicle having a plurality of tires which include a mounted tire mounted on an axle of the vehicle and a non-mounted tire carried by the vehicle, the apparatus comprising:

tire state detectors which are provided on the respective tires and each of which detects a state of a corresponding one of the tires;

local transceivers which are provided on the respective tires and which transmit tire data sets relating to the respective tires, each of the tire data sets including at least one tire-state data element representative of the detected state of a corresponding one of the tires;

a central receiver which is provided on a body of the vehicle and which receives the tire data sets transmitted by the local transceivers;

non-mounted-tire detectors which are provided on the respective tires and each of which effects a determination as to whether a corresponding one of the tires is the non-mounted tire or not; and data-transmission modifiers which are provided on the respective tires, each of the data-transmission modifiers being operable in response to an affirmative decision by a corresponding one of the non-mounted-tire detectors in the determination, to modify transmission of a corresponding one of the tire data sets to the central receiver.

In the detection/communication apparatus of this mode (11) of the present invention in which the non-mounted-tire detectors are provided on the respective tires and each of which effects the determination as to whether the corresponding tire is the non-mounted tire or not, one of the non-mounted-tire detectors (that is provided on the tire actually not mounted on the axle of the vehicle) detects the non-mounted tire, namely, determines that the corresponding tire is the non-mounted tire. One of the data-transmission modifiers (that is provided on the tire actually not mounted on the axle of the vehicle) modifies the transmission of the corresponding tire data set to the central receiver, so that the received non-mounted-tire data set is distinguishable from the received mounted-tire data set in the central receiver. It is noted that the technical feature described in any one of the above modes (3)–(10) is applicable to the detection/communication apparatus of this mode (11).

(12) A detection/communication apparatus according to mode (11), wherein each of the non-mounted tire detectors includes an information-basis detecting portion which effects the determination on the basis of information received by a corresponding one of the local transceivers.

The detection/communication apparatus described in each of the above modes (1)–(10) may be interpreted as one embodied form of the detection/communication apparatus of this mode (12).

(13) A detection/communication apparatus according to mode (12), further comprising:

a particular-signal transmitter which is provided on the body of the vehicle and which transmits a particular signal, wherein the information-basis determining portion includes a particular-signal-basis determining portion which determines that the corresponding one of the tires is the non-mounted tire if the particular signal is received by the corresponding one of the local transceivers.

(14) A detection/communication apparatus according to any one of modes (11)–(13), wherein each of the non-mounted tire detectors includes a tire-state-basis determining portion which effects the determination on the basis of the state of the corresponding one of the tires.

In the detection/communication apparatus of this mode (14) of the invention, the distinction of the non-mounted tire from the mounted tire can be made even without provision of a signal transmitter as described in above mode (12), leading to a reduction in a required cost of manufacture of the apparatus.

(15) A detection/communication apparatus according to mode (14), wherein each of the tire state detectors includes a tire-motion detector which detects a motion of a corresponding one of the tires, and wherein the tire-state-basis determining portion includes a tire-motion-basis determining portion which effects the determination on the basis of the detected motion of the corresponding one of the tires.

It is common that the vibration of the non-mounted tire is smaller than that of the mounted tire during running of the vehicle in which the non-mounted tire is not rotated while the mounted tire is rotated. Therefore, it is possible to distinguish the non-mounted tire from the mounted tire on the basis of a signal outputted from each of the tire-motion detectors provided on the respective tires. It is noted that each of the tire-motion detectors may be provided, for example, by a vibration sensor, a centrifugal-force sensor or a vibration sensor which serves also as a centrifugal-force sensor.

(16) A detection/communication apparatus to be installed on a vehicle having a plurality of tires which include a mounted tire mounted on an axle of the vehicle and a non-mounted tire carried by the vehicle, the apparatus comprising:

tire state detectors which are provided on the respective tires and each of which detects a state of a corresponding one of the tires;

local transceivers which are provided on the respective tires; and a central receiver which is provided on a body of the vehicle and which includes a non-mounted-tire-signal receiving antenna, wherein the non-mounted-tire-signal receiving antenna has at least one of a sensitivity and a directivity which enables the receiving antenna to receive a signal transmitted from one of the local transceivers provided on the non-mounted tire, and which disables the receiving antenna to receive a signal transmitted from one of the local transceivers provided on the mounted tire.

In the detection/communication apparatus of this mode (16) of the invention in which the central receiver includes the non-mounted-tire-signal receiving antenna capable of receiving only the signal transmitted from the local transceiver provided on the non-mounted tire, the signal transmitted from the local transceiver provided on the non-mounted tire can be received separately from the signal transmitted from the mounted tire.

(17) A detection/communication apparatus according to mode (16), wherein the local transceivers transmit the tire data sets at respective time intervals different from each other.

In the detection/communication apparatus of this mode (17) of the invention in which the tire data sets are transmitted at the different time intervals, the tire data sets can be transmitted at respective points of times different from each other so that two or more tire data sets are not likely to be concurrently received by the central receiver. Although there is a possibility of the concurrent reception of two or more tire data sets, such a concurrent reception is not successively occurred.

(18) A detection/communication apparatus to be installed on a vehicle having a plurality of tires which include a regular tire and a temporary tire, the apparatus comprising:

a regular-tire state detector which is provided on the regular tire and which detects a state of the regular tire;

a temporary-tire state detector which is provided on the temporary tire and which detects a state of the temporary tire;

a regular-tire data transmitter which is provided on the regular tire and which transmits a regular-tire data set relating to the regular tire, the regular-tire data set including at least one regular-tire-state data element representative of the detected state of the regular tire;

a temporary-tire data transmitter which is provided on the temporary tire and which transmits a temporary-tire data set relating to the temporary tire, the temporary-tire data set including at least one temporary-tire-state data element representative of the detected state of the temporary tire, and having a data amount smaller than that of the regular-tire data set;

a central receiver which is provided on a body of the vehicle and which receives the regular-tire data set and the temporary-tire data set transmitted by the regular-tire data transmitter and the temporary-tire data transmitter, respectively; and a data processor which processes the regular-tire data set in a regular-tire data processing manner and which processes the temporary-tire data set in a temporary-tire data processing manner that is different from the regular-tire data processing manner.

As a kind of the temporary tire which is normally carried as a non-mounted tire or spare tire by the vehicle and which is mounted on the axle of the vehicle only in case of emergency, there is a so-called "T-type tire" known as a "Tempa Tire" (trademark). Since the temporary tire is temporarily used as the mounted tire, the temporary-tire state detector may have a construction simpler than that of the regular-tire state detector. Similarly, the temporary-tire data transmitter may have a construction simpler than that of the regular-tire data transmitter. Further, it is commonly preferable that the temporary-tire data set and the regular-tire data set are processed differently from each other. In these respects, the detection/communication apparatus of this mode (18) of the invention can be manufactured at reduced cost and can process each of the tire data sets in a suitable manner. It is noted that the regular-tire state and temporary-tire state detectors and/or the regular-tire data and temporary-tire data transmitters may be provided by a common detector device and/or common transmitter device.

(19) A detection/communication apparatus according to mode (18), wherein the above-described at least one regular-tire data element of the regular-tire data set includes a data element representative of an air pressure value of the regular tire detected by the regular-tire state detector while the above-described at least one temporary-tire data element of the temporary-tire data set includes a data element representative of an air pressure value of the temporary tire detected by the temporary-tire state detector, and wherein the data processor includes an air-pressure abnormality detector which detects an abnormality of the air pressure value of the regular tire, by checking if the air pressure value of the regular tire is lower than a first minimum value, and which detects an abnormality of the air pressure value of the temporary tire, by checking if the air pressure value of the temporary tire is lower than a second minimum value that is higher than the first minimum value.

It is common that the air pressure of the temporary tire such as the T-type tire is intended to be higher than that of the regular tire, for example, such that the air pressure of the temporary tire is twice as high as that of the regular tire. In this respect, the arrangement in which the air pressure of the temporary tire is checked with the minimum value that is relatively high is significant.

(20) A communication apparatus to be installed on a vehicle having a plurality of tires which include a mounted tire mounted on an axle of the vehicle and a non-mounted tire carried by the vehicle, the apparatus comprising:

local transceivers which are provided on the respective tires and which transmit tire data sets relating to the respective tires;

a central receiver which is provided on a body of the vehicle;

a particular-signal transmitter which is provided on the body of the vehicle and which transmits a particular signal; and non-mounted-tire-data transmission commanders which are provided on the respective tires, each of the non-mounted-tire-data transmission commanders being operable depending upon a state of reception of the particular signal by a corresponding one of the local transceivers, to command the corresponding one of the local transceivers to transmit a corresponding one of the tire data sets as a non-mounted-tire data set relating to the non-mounted tire.

In the vehicle-tire-data communication apparatus of this mode (20) of the present invention, the particular-signal transmitter may be disposed in the vicinity of a space in which the non-mounted tire is stored, so that the particular signal transmitted by the particular-signal transmitter can be received by one of the local transceivers that is provided on the non-mounted tire. In this arrangement, one of the non-mounted-tire-data transmission commanders that is provided on the non-mounted tire is activated in response to the reception of the particular signal by the local transceiver provided on the non-mounted tire, to command the corresponding local transceiver to transmit the corresponding tire data set as the non-mounted-tire data set relating to the non-mounted tire. Thus, the non-mounted-tire data set is identifiable among the tire data sets transmitted from the respective local transceivers to the central receiver. It is noted that the particular-signal transmitter may serve as an initiator, so that communication between the local transceiver provided on the non-mounted tire and the central receiver is initiated in response to the transmission of the particular signal by the particular-signal transmitter. It is also noted that the technical feature described in any one of the above modes (1)–(19) is applicable to the vehicle-tire-data communication apparatus of this mode (20).

(21) A communication apparatus according to mode (20), further comprising:

data-transmission modifiers which are provided on the respective tires, each of the data-transmission modifiers being operable together with a corresponding one of the transmission commanders, to modify transmission of the corresponding one of the tire data sets by the corresponding one of the local transceivers.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
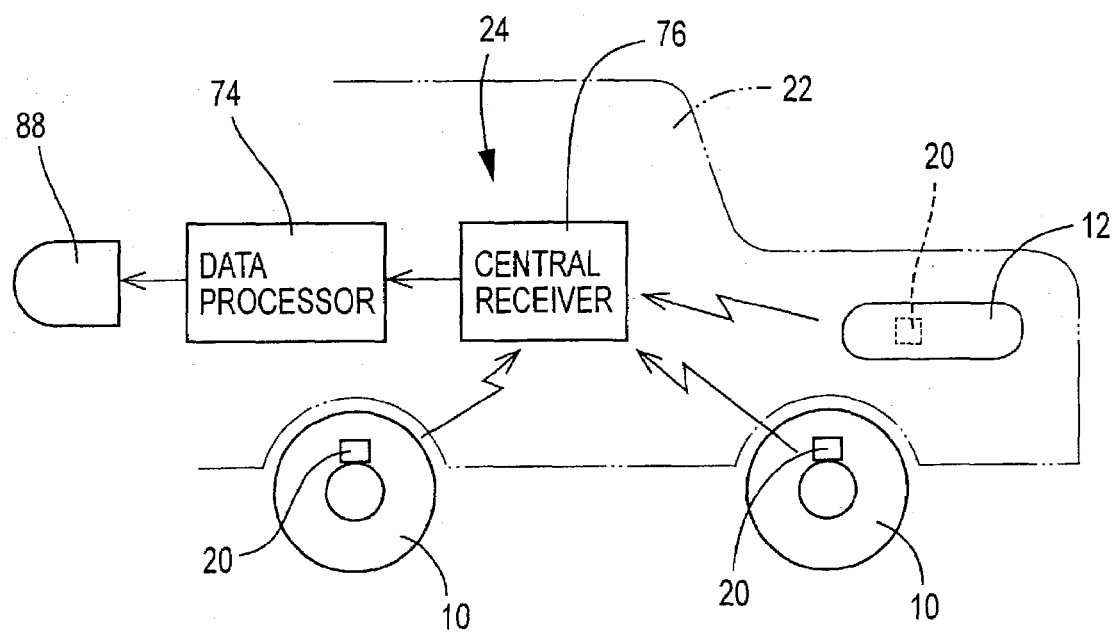
FIG. 1 is a schematic view showing a vehicle equipped with a detection/communication apparatus which is constructed according to an embodiment of this invention.
Figure 2:
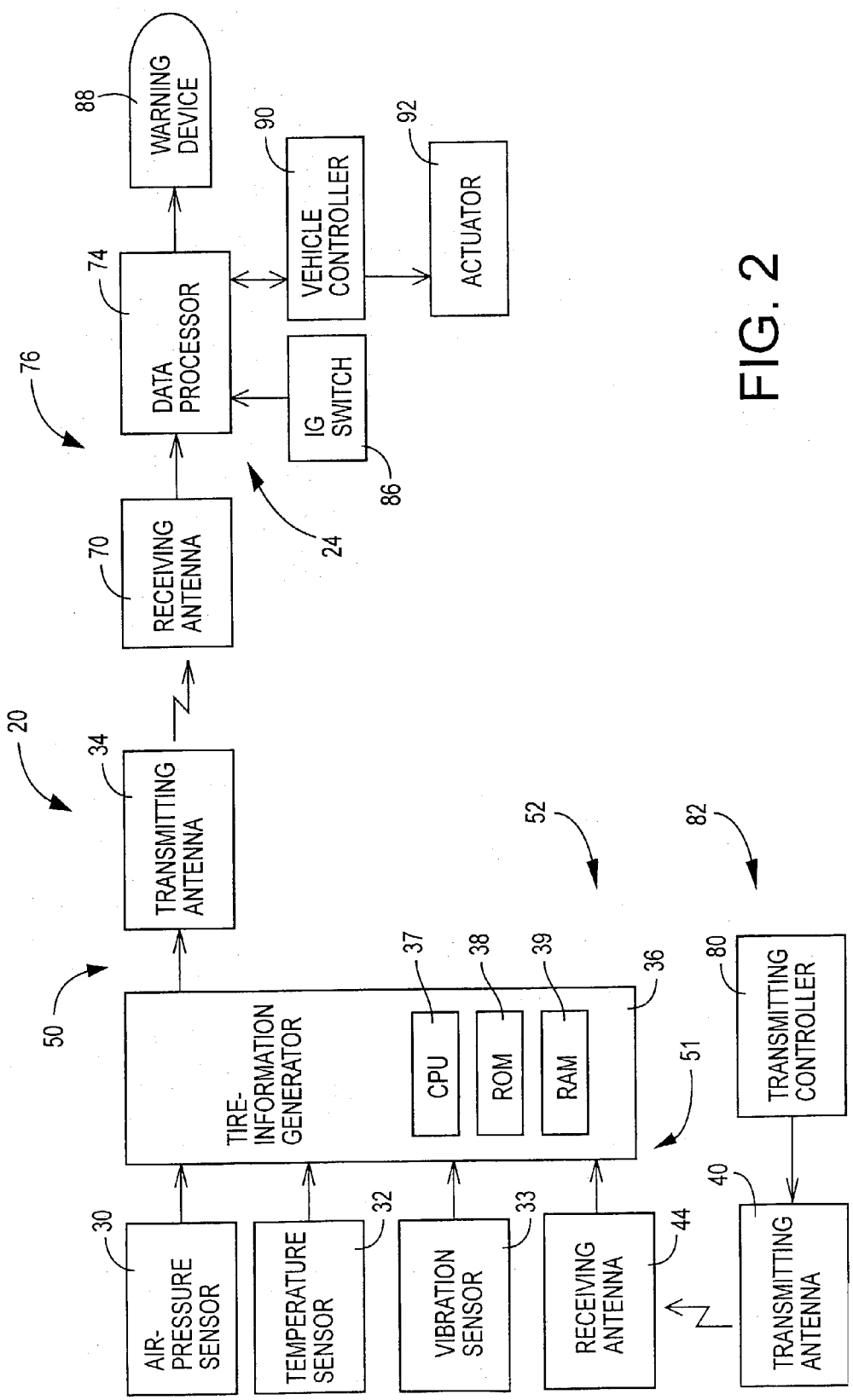
FIG. 2 is a block diagram showing the detection/ communication apparatus of FIG. 1.

Referring to first to FIGS. 1 and 2, there is shown a detection/communication apparatus which is constructed according to an embodiment of this invention. As shown in FIG. 1, four regular tires 10 are mounted as mounted tires on axles of a vehicle which is provided with the detection/communication apparatus, such that the four regular tires serve as front right and left wheels FR, FL and rear right and left wheels RR, RL. A spare tire 12 is stored as a non-mounted tire in a luggage space located in a rear portion of a body 22 of the vehicle. Each of the tires 10, 12 may be referred also to as "tired wheel", since each of tires 10, 12 is mounted on a wheel. While the spare tire 12 is located inside the vehicle body 22 in the present embodiment, the spare tire may be located outside the vehicle body 22, for example, may be hung on a rear wall of the vehicle body 22, or fixedly disposed under a floor of the vehicle body 22.

As shown in FIG. 2, each of the tires 10, 12 is provided with a local unit 20, while the vehicle body 22 is provided with a central unit 24. The local unit 20 includes: an air pressure sensor 30 for detecting an air pressure of a corresponding one of the tires 10, 12; a temperature sensor 32 for detecting a temperature of the corresponding tire; a vibration sensor 33 for detecting a vibration applied to the corresponding tire; a transmitting antenna 34 for transmitting tire information in the form of a tire data set which includes an air pressure data and a temperature data representing the detected air pressure and temperature of the corresponding tire, respectively; and a tire information generator 36 for generating the tire data set. The local unit 20 further includes a receiving antenna 44 which is capable of receiving a particular signal transmitted from a transmitting antenna 40 provided in the vehicle body 22. The tire information generator 36 is constituted principally by a computer including a CPU 37, a ROM 38, a RAM 39 and input and output portions. To the input portion, there are connected the air pressure sensor 30, the temperature sensor 32, the vibration sensor 33 and the receiving antenna 44. To the output portion, there is connected the transmitting antenna 34. The ROM 38 serves as a data storage to store various control programs such as a program for executing a data-transmission modifying routine which is illustrated by the flow chart of FIG. 5 or FIG. 6.

Figure 3:
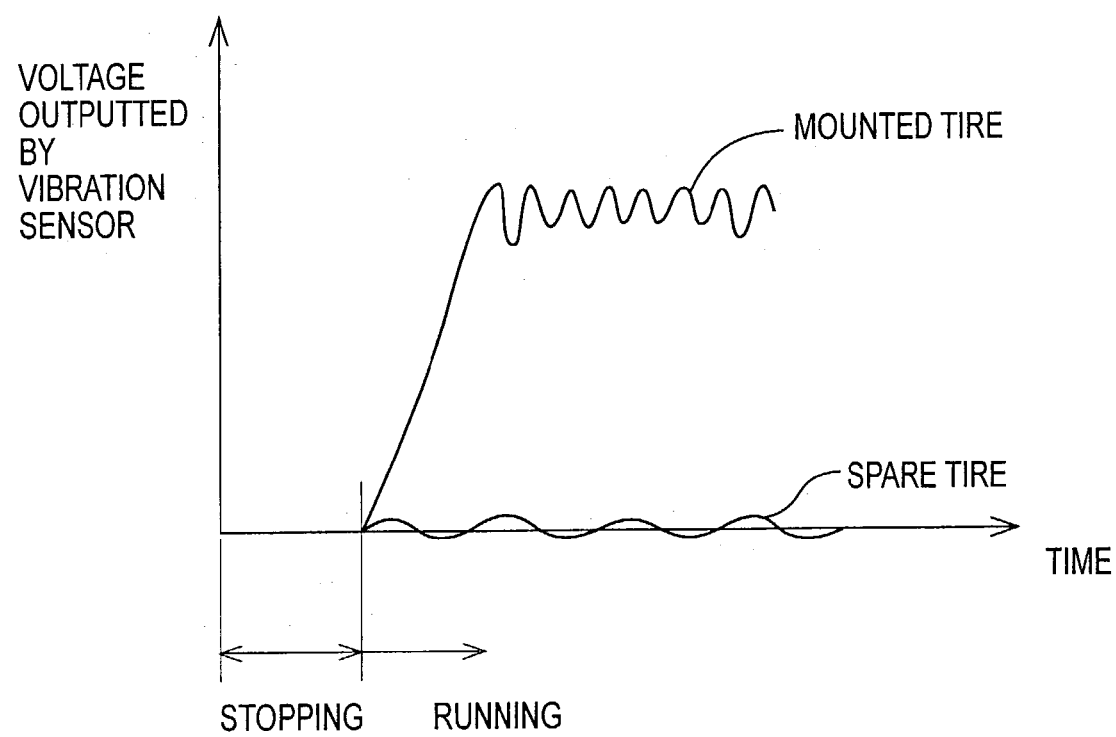
FIG. 3 is a graph indicating vibrations of a mounted tire and a non-mounted tire.

The vibration sensor 33 includes an inertial mass and an elastic body which supports the inertial mass. The vibration sensor 33 is disposed within each tire, and is fixed to a predetermined portion of the tire so as to detect vibration of the predetermined portion of the tire. The vibration sensor 33 is adapted to output a signal whose voltage is variable depending upon an amount of displacement of the inertial mass relative to the above-described predetermined portion of the tire. In the present embodiment, the vibration sensor 33 is arranged to detect vibration applied principally in a radial direction of the tire. This is because each of the mounted tires 10 is vibrated in the radial direction due to a centrifugal force (rotational acceleration) acting on the mounted tire 10 as a result of rotation of the mounted tire 10, although the mounted tire 10 is vibrated also in the other directions as a result of running of the vehicle. On the other hand, there is substantially no centrifugal force acting on the spare tire 12, although the spare tire 12 is somewhat vibrated as a result of running of the vehicle. Therefore, the voltage outputted by the vibration sensor 33 provided in each mounted tire 10 is higher than the voltage outputted by the sensor 33 provided in the spare tire 12, by at least an amount corresponding to influence of the centrifugal force, as shown in the graph of FIG. 3. In this sense, the vibration sensor 33 may be referred also to as an acceleration sensor. It is noted that the vibration sensor 33 may be adapted to detect exclusively the vibration acting on the tire in a particular direction, and not detect the vibration acting in the other directions. For example, it is preferable that the vibration sensor 33 is arranged to detect exclusively the vibration acting in the radial direction, or to detect the vibration acting in the radial direction more easily than that acting in the other direction. It is also noted that the vibration of the tire is detected by the vibration sensor 33 at a predetermined time interval in the present embodiment.

The air pressure and the temperature of the tire are respectively detected by the air-pressure sensor 30 and the temperature sensor 32 at predetermined time intervals, so that the tire information generator 36 generates the tire data set on the basis of the detected air pressure and temperature. The generated tire data set is transmitted from the transmitting antenna 34, by executing the data-transmission modifying routine which is illustrated by the flow chart of FIG. 5 or FIG. 6. In the present embodiment, a portion of the tire information generator 36 that is assigned to function as a transmitting controller cooperates with the transmitting antenna 34 to constitute a transmitter 50, while a portion of the tire information generator 36 that is assigned to function as a receiving controller cooperates with the receiving antenna 44 to constitute a receiver 51. The transmitter 50 and the receiver 51 cooperates with each other to constitute a local transceiver 52. It is noted that the transmitting antenna 34 and the receiving antenna 44 may be provided by a single antenna which functions as a transmitting/receiving antenna.

In the present embodiment, the local units 20 provided in the respective tires 10, 12 transmit the respective tire data sets at respective time intervals slightly different from one another, so that two or more tire data sets are not likely to be concurrently received by the central unit 24. For example, where an average value of the different time intervals is 10 minutes, each one of the time intervals may be set to be a value that is not shorter than 9 minutes and not longer than 11 minutes, such that the tire data sets are transmitted from the respective transmitting antennas 34 at respective points of time different from each other. Although there is a possibility of the concurrent reception of two or more tire data sets by the central unit 24, such a concurrent reception is not occurred successively. It is noted that the time interval of the transmission of the tire data set from the non-mounted tire 12 is changed to be longer than that of the transmission of the tire data set from each of the mounted tires 10, as described later in detail.

Figure 4:
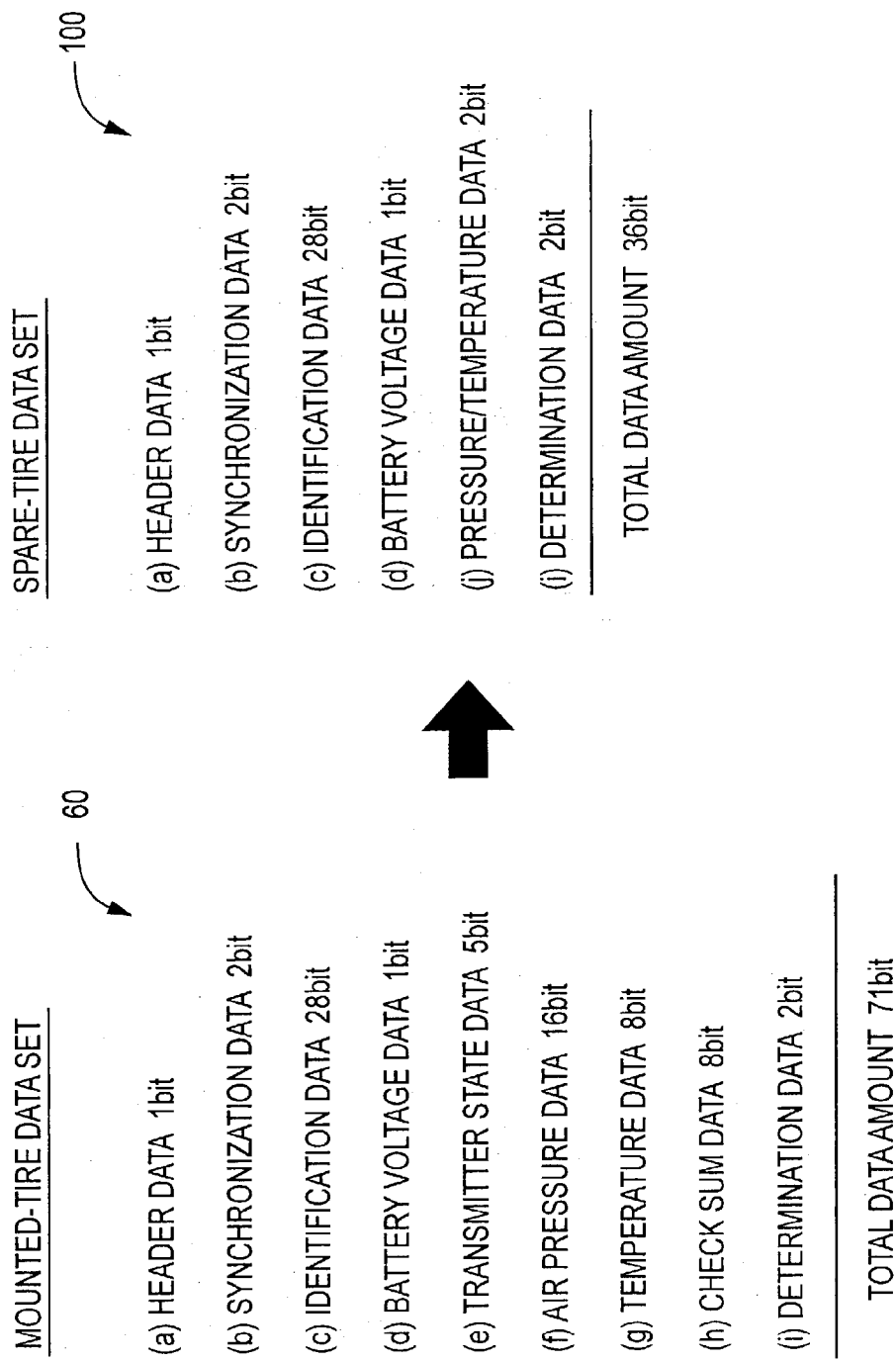
FIG. 4 is a view illustrating tire information in the form of a mounted-tire data set and a non-mounted-tire data set.

The tire data set (hereinafter referred to as a mounted-tire-data set 60) transmitted from the transmitter 50 of each mounted tire 10 includes (a) a header data; (b) a synchronization data; (c) an identification data; (d) a battery voltage data (representative of a residual amount of electric energy left in a battery used in the transceiver 52); (e) a transmitter state data; (f) an air pressure data; (g) a tire-temperature data; (h) a check sum data; and (i) a determination data, as shown in FIG. 4. The synchronization data is provided for synchronization of the transmitter 50 with a central receiver 76 of the central unit 24. The identification data is provided to identify each of the tires 10, 12 from which the tire data set is transmitted. The identification data is constituted by a code proper to the corresponding tire. The check sum data is provided for effecting a parity check or for otherwise checking an actual total volume of the tire data set transmitted from the transmitter 50. The determination data is constituted by two binary digits, i.e., "00", "10" or "01". The determination data is constituted by "00" where the corresponding tire is one of the mounted tires 10, constituted by "10" where the corresponding tire is the spare tire 12, and constituted by "01" where the corresponding tire is probably the spare tire 12. Of these data elements constituting the tire data set, the air pressure data and the temperature data correspond to tire-state data elements. The tire data set transmitted from the transmitter 50 of the spare tire 12 will be described later.

The central unit 24 provided in the vehicle body 22 includes the above-described central receiver 76 and a particular-signal transmitter 82, as shown in FIG. 2. The central receiver 76 includes a receiving antenna 70 for receiving the tire data sets transmitted from the respective local units 20, and a data processing device 74 for processing the received tire data sets. The particular-signal transmitter 82 includes the above-described transmitting antenna 40 and a transmitting controller 80. The data processing device 74 is constituted principally by a computer including a CPU, a ROM, a RAM and input and output portions. To input and output portions of the data processing device 74, there are connected the receiving antenna 70, an ignition switch 86 and a warning device 88. The data processing device 74 includes a data-form converter which converts the received tire data sets into forms processable by the computer, and a tire-state abnormality detector which determines whether the state of each of the tires 10, 12 is abnormal or not on the basis of the tire-state data elements of the corresponding tire data set. The warning device 88 is activated if the state of at least one of the tires 10, 12 is determined to be abnormal. The ROM of the data processing device 74 serves as a data storage to store various control programs such as programs for executing a data processing routine and an informing-device controlling routine which are respectively illustrated by the flow charts of FIGS. 9 and 10. In the present embodiment, the central receiver 76 may be considered to be constituted by the receiving antenna 70 and the data processing device 74, or alternatively, may be considered to be constituted by the receiving antenna 70 and the above-described data-form converter of the data processing device 74.

To the data processing device 74, there is connected a vehicle controller 90, so that the air pressure data and other data elements are supplied from the data processing device 74 to the vehicle controller 90. The vehicle controller 90 is principally constituted by a computer including a CPU, a ROM, a RAM and input and output portions, and controls an actuator 92 for controlling a running state of the vehicle.

In the central unit 24, each time the tire data set has been received by the receiving antenna 70, the received tire data set is processed by the data processing device 74. The warning device 88 is activated as needed, for example, when the tire state is determined to be abnormal. In the present embodiment, the warning device 88 includes a sound emitter capable of emitting a warning buzzer, chime or other sound so that the vehicle operator is auditorily informed of the abnormality of the tire state. However, the warning device 88 may include, in place of or in addition to the sound emitter, a display device capable of displaying a warning message, a lamp flashable or other device for visually informing the vehicle operator of the abnormality. It is noted that the warning device 88 may be adapted to inform the vehicle operator of a normality of the tire state when the tire state is normal, or may be adapted to inform the operator of the specific state of the tire such as current values of the air pressure and temperature.

The transmitting antenna 40 of the particular-signal transmitter 82 is disposed in the vicinity of a space in which the spare tire 12 is stored, so that the transmitting antenna 40 is positioned to be closer to the spare tire 12 than to the mounted tires 10. Further, at least one of an output strength and a direction of the transmitting antenna 40 is adjusted or oriented in such a manner that enables the particular signal to be received by the receiving antenna 44 provided in the spare tire 12 and that disables the particular signal to be received by the receiving antennas 44 provided in the respective mounted tires 10. The transmitting antenna 40 is controlled by the transmitting controller 80 disposed in the vehicle body 22, such that the particular signal is transmitted to the receiving antenna 44 of the spare tire 12 at a predetermined time interval. This time in interval of the transmission of the particular signal may be set to be a desired value that is smaller than the time interval of the transmission of the tire data set to the central receiver 76 from the transmitter 50 provided in the spare tire 12. Where the time interval of the transmission of the tire data set from the transmitter 50 provided in the spare tire 12 is 10 minutes, for example, the time interval of the transmission of the particular signal may be set to be about 8 minutes, or alternatively, may be set to be a still smaller value (e.g., 30 seconds) so that the particular signal is transmitted in substantially a continuous manner. Further, the particular-signal transmitter 82 does not have to be activated necessarily at a predetermined time interval but may be activated in response to a certain operation effected by the vehicle operator, for example, when the ignition switch 86 is placed in its ON state.

Figure 5:
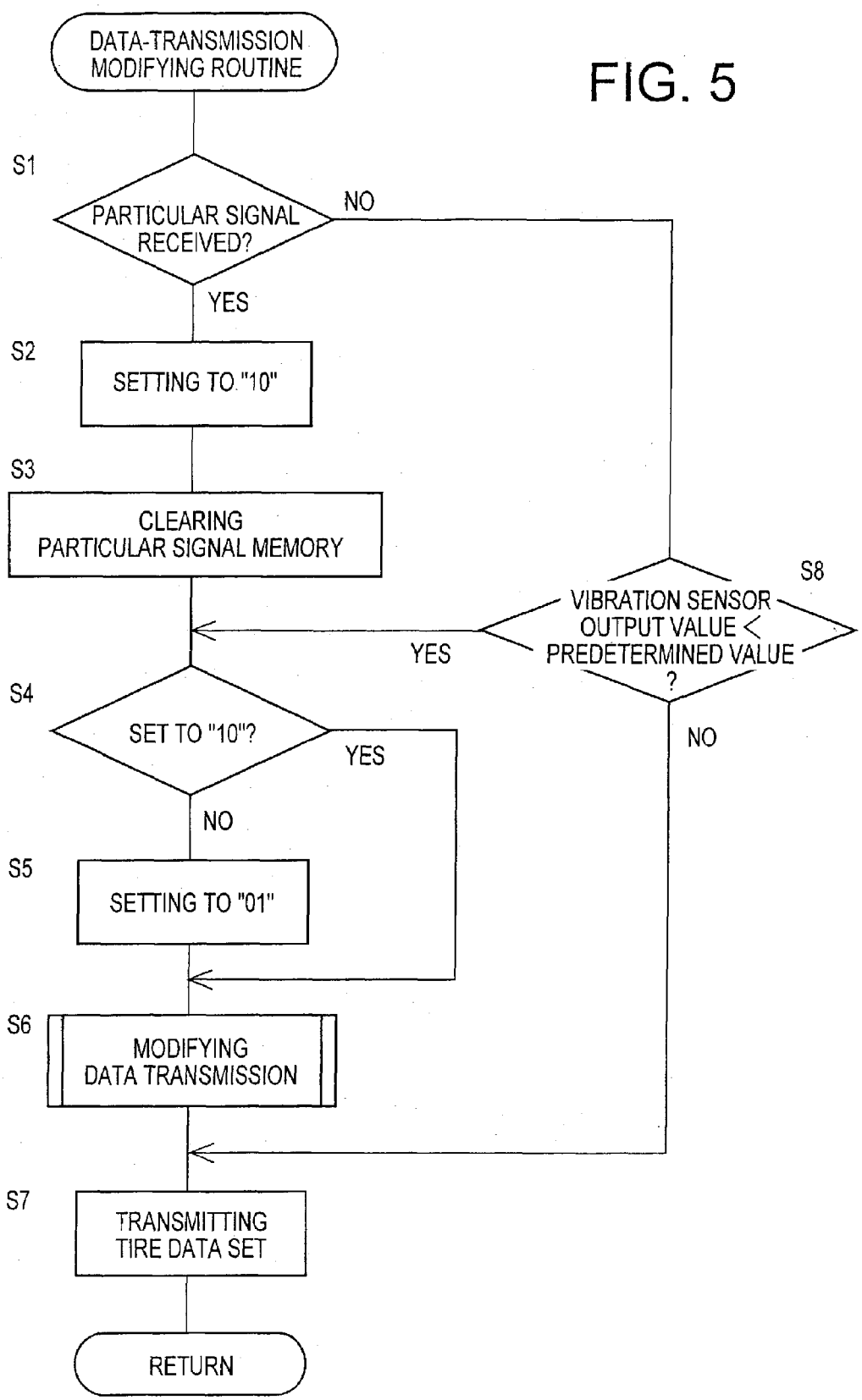
FIG. 5 is a flow chart illustrating a data-transmission modifying routine executed according to a control program stored in a data storage of a local unit (provided on each tire) of the detection/communication apparatus.
Figure 6:
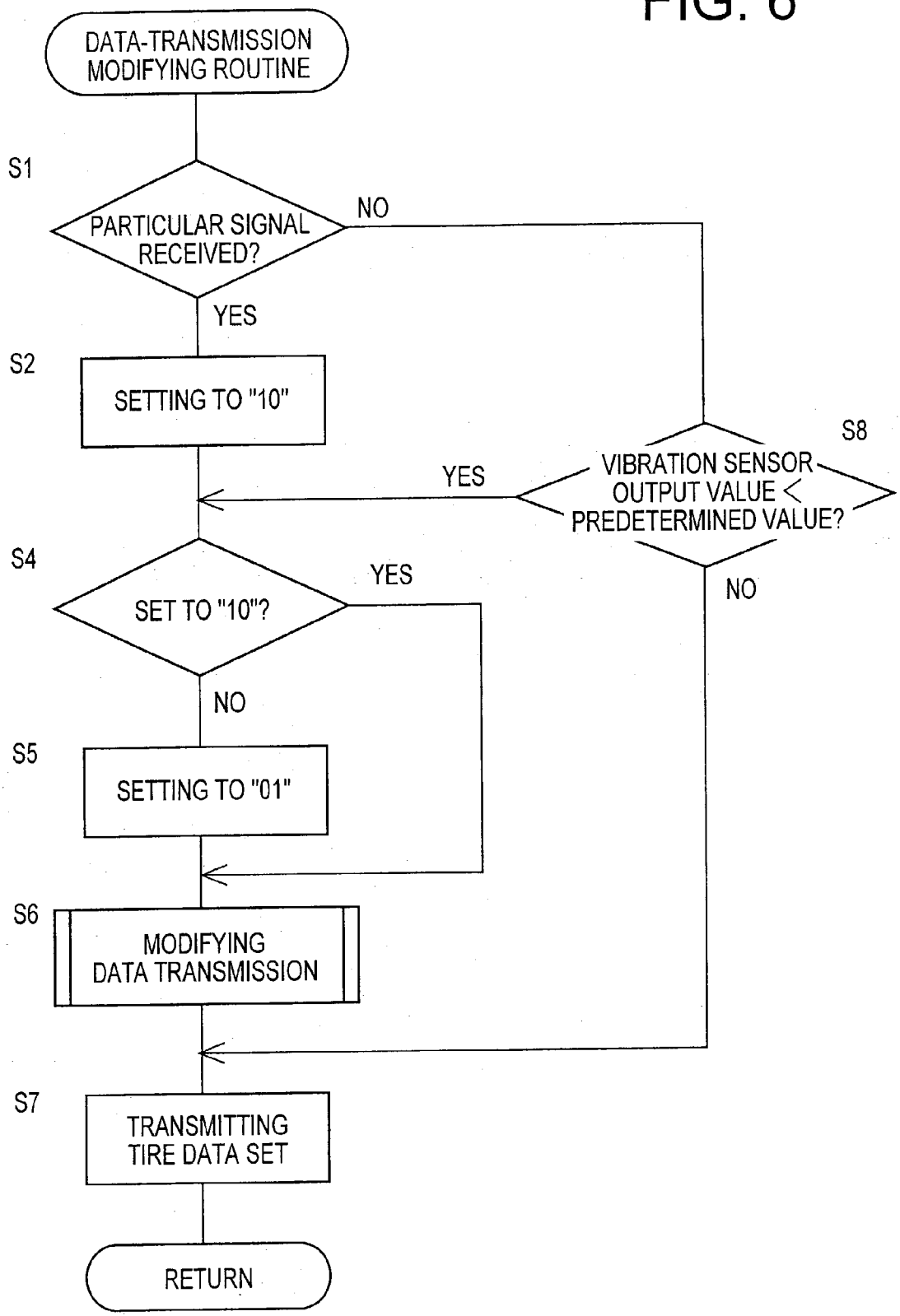
FIG. 6 is a flow chart illustrating a modification of the data-transmission modifying routine of FIG. 5.

In the present embodiment, the particular-signal transmitter 82 including the transmitting antenna 40 serves as an initiator for initiating the communication between the particular-signal transmitter 82 and the local unit 20 of the spare tire 12. That is, the communication is initiated upon transmission of the particular signal from the particular-signal transmitter 82. The above-described data-transmission modifying routine is then executed at a predetermined time interval. Where the time interval of the transmission of the particular signal is so short that the particular signal is transmitted in substantially a continuous manner, it is determined whether the particular signal is received or not, each time the execution of the data-transmission modifying routine is initiated. On the other hand, where the time interval of the transmission of the particular signal is so long as 8 minutes, for example, the receiving controller of the tire-information generator 36 is activated in response to the reception of the particular signal so that the fact of the reception of the particular signal is memorized in a particular-signal memory of the RAM 39 of the tire-information generator 36, for thereby waiting for the data-transmission modifying routine to be executed.

Where the time interval of the transmission of the particular signal is relatively long (e.g. about 8 minutes), namely, where the time interval of the transmission of the particular signal is slightly shorter than that of the transmission of the tire data set from the transmitter 50 provided in the spare tire 12, the data-transmission modifying routine illustrated by the flow chart of FIG. 5 is executed. Where the time interval of the transmission of the particular signal is relatively short, namely, where the particular signal is transmitted substantially in a continuous manner, another data-transmission modifying routine illustrated by the flow chart of FIG. 6 is executed. Each of the data-transmission modifying routines will be described in detail, by reference to the flow chart of FIG. 5 or FIG. 6.

The data-transmission modifying routine of FIG. 5 is initiated with step S1 to determine whether the particular signal transmitted from the transmitting antenna 40 has been received by the local transceiver 52 (the receiving antenna 44), by checking if the fact of the reception of the particular signal is memorized in the RAM 39 of the tire-information generator 36. If the particular signal has been received by the local transceiver 52, namely, if an affirmative decision is obtained in step S1, it is determined that the tire in which the local transceiver 52 in question is provided is the spare tire 12 so that the determination data of the tire data set relating to the tire in question is set to "10" in step S2. Step S3 is then implemented to clear the above-described particular-signal memory of the RAM 39 of the tire-information generator 36 (provided in the tire in question). Step S3 is followed by step S4 which is implemented to determine whether the determination data is currently provided by "10" or not. If an affirmative decision is obtained in step S4, the control flow goes to step S6, skipping over step S5. Step S6 is implemented to modify transmission of the tire data set (relating to the spare tire 12) that is effected by the local transceiver 52 in question. Namely, step S6 is implemented to modify the tire data set and a transmitting manner in which the tire data set is to be transmitted. Step S7 is then implemented to transmit the modified tire data set in the modified transmitting manner, from the transmitting antenna 34 of the local transceiver 52 in question to the receiving antenna 70 of the central receiver 76.

If the fact of the reception of the particular signal is not memorized at a point of time of the determination of step S1, a negative decision is obtained in step S1, whereby the control flow goes to step S8 in which it is determined whether an actual output value of the vibration sensor 33 is smaller than a predetermined value or not. This predetermined value is larger than a maximum output value that can be possibly outputted by the vibration sensor 33 provided in the spare tire 12, and is smaller than a minimum output value that can be possibly outputted by the vibration sensor 33 provided in one of the mounted tires 10 during running of the vehicle. If a negative decision is obtained in step S8, the tire (in which the vibration sensor 33 in question is provided) is determined to be one of the mounted tires 10. In this case, step S6 is not implemented so that the tire data set (generated by the tire-information generator 36 provided in the mounted tire 10) is transmitted from the transmitting antenna 34 of the local transceiver 52 in question to the receiving antenna 70 of the central receiver 76, without the tire data set and the transmitting manner being modified. If an affirmative decision is obtained in step S8, namely, if the actual output value of the vibration sensor 33 is smaller than the predetermined value, there is a high possibility that the tire in question is the spare tire 12, whereby step S4 and the following steps are implemented. Where step S4 is thus implemented without implementation of step S2, a negative decision is obtained in step S4 since the determination data of the tire data set has not been set to "10". The negative decision in step S4 is followed by step S5 in which the determination data is set to be "01". In the subsequent steps S6 and S7, the transmission of the tire data set is modified, and the tire data set is transmitted to the central receiver 76.

As is clear from the above description, in the present embodiment, the tire is determined or considered to be the spare tire 12, if the particular signal has been received by the local transceiver 52 in question, or if the actual output value of the vibration sensor 33 in question is smaller than the predetermined value. That is, it is determined or considered that the tire is the spare tire 12, with satisfaction of at least one of the two conditions, one of which relates to the reception of the particular signal while the other of which relates to the state of the tire. This arrangement is effective, where the particular signal becomes unreceivable in the event of a failure of the particular-signal transmitter 82 or the receiving antenna 44, to prevent an erroneous determination as to whether each tire is the spare tire 12 or one of the mounted tires 10. It might be possible that the particular-signal transmitter 82 or the receiving antenna 44 fails concurrently with a failure of the vibration sensor 33. However, a possibility of such a concurrent failure of two or more components of the apparatus is extremely low, so that the spare tire 12 is detected with a high reliability in this arrangement. It is noted that any one of the mounted tires 10 could be provisionally determined as the spare tire during stopping of the vehicle during which the output value of any one of the vibration sensors 33 could be smaller than the predetermined value. However, the output value of any one of the vibration sensors 33 provided in the mounted tires 10 becomes larger than the predetermined value immediately after initiation of running of the vehicle, whereby such a provisional determination is replaced by a correct determination that each mounted tire 10 is correctly determined as one of the mounted tires 10.

Figure 7:
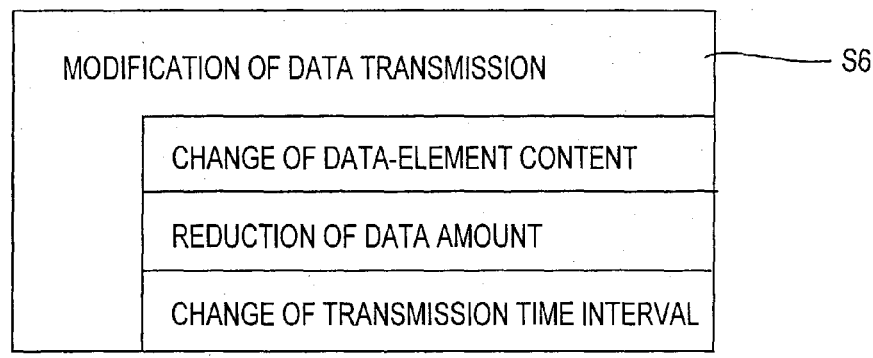
FIG. 7 is a view explaining a content of modification of the transmission of the tire data set, which is effected in the above-described data-transmission modifying routine of Fig. 5 or FIG. 6.

The modification of the transmission of the tire data set in step S6 will be described. In the tire-information generator 36 provided in the spare tire 12, there is generated a spare-tire data set 100 as the non-mounted-tire data which is a modification of the above-described mounted-tire data set 60 (generated in each of the tire-information generators 36 provided in the respective mounted tires 10). The generated spare-tire data set 100, shown in FIG. 4, is transmitted to the central receiver 76 provided in the vehicle body 22. As shown in FIG. 7, the modification of the transmission of the tire data set includes: (1) changing a content of a data element of the tire data set such that the changed content of the data element indicates that the tire data set relates to the spare tire; (2) changing the data amount of the tire data set such that the changed data amount (i.e., the data amount of the spare-tire data set 100) is smaller than the non-changed data amount (i.e., the data amount of the mounted-tire data set 60); and (3) changing the time interval of the transmission of the tire data set such that the changed time interval (at which the spare-tire data set 100 is transmitted) is different from the non-changed time interval (at which the mounted-tire data set 60 is transmitted).

In the present embodiment, the determination data corresponds to the data element to be changed to indicate that the tire data set relates to the spare tire. The determination data is set to be "10" where the tire in question is determined to be the spare tire 12. The determination data is set to be "01" where the tire in question is considered to be the spare tire 12. That is, the determination data "10" represents that the tire in question is spare tire 12. The determination data "01" represents that the tire in question is probably spare tire 12.

Figure 8:
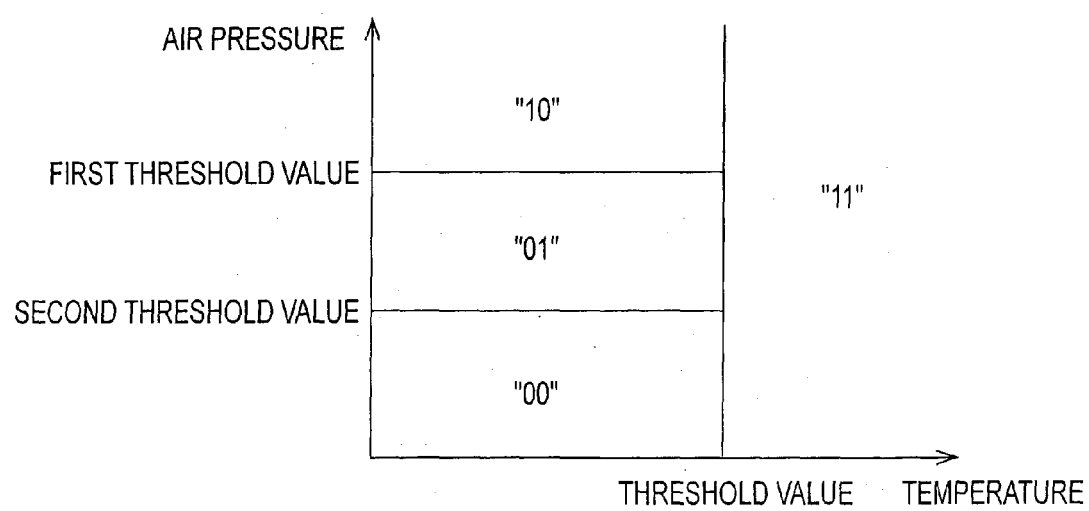
FIG. 8 is a view indicating four patterns of air pressure/ temperature data of the non-mounted tire data set.

The spare-tire data set 100, whose data amount is smaller than that of the mounted-tire data set 60, includes: (a) a header data (1 bit); (b) a synchronization data (2 bits); (c) an identification data (28 bits); (d) a battery voltage data (1 bit); (j) an air pressure/temperature data (2 bits); and (i) a determination data (2 bits), as shown in FIG. 4. The total data amount of the spare-tire data set 100 is 36 bits, which is about a half of the data amount (71 bits) of the mounted-tire data set 60. Of these data elements constituting the spare-tire data set 100, the air pressure/temperature data correspond to a tire-state data element. Each of the air pressure value and the temperature of the spare tire 12, used merely for determining whether the spare tire is normal or abnormal, does not have to be represented by a complicated data but may be represented by a simple data. For example, where a threshold value is provided as a permissible maximum value with respect to the tire temperature while first and second threshold values are respectively provided as a low value and a permissible minimum value with respect to the tire air pressure, as shown in FIG. 8, the air pressure/temperature data can be constituted by only two binary digits (2 bits). This data amount of the air pressure/temperature data is remarkably small as compared with a sum of the data amount (16 bits) of the air pressure data and the data amount (8 bits) of the temperature data of the mounted-tire data set 60. The reduction of the data amount of the tire data set leads to reduction in consumption of the electric energy generated by the battery as the power source, thereby prolonging the service life of the battery.

Further, the time interval of the transmission of the tire data set where the tire in question is the spare tire 12, is adapted to be different from the time interval of the transmission of the tire data set where the tire in question is the mounted tire 10. Namely, the time interval of the transmission of the spare-tire data set 100 is adapted to be different from that of the mounted-tire data set 60. For example, the time interval of the transmission of the spare-tire data set 100 may be two or more times as long as that of the transmission of the mounted-tire data set 60, so that the spare-tire data set 100 is transmitted once while the mounted-tire data set 60 is transmitted a predetermined number of times. This arrangement is effective to reduce a possibility that the mounted-tire data set 60 and the spare-tire data set 100 are concurrently received by the receiving antenna 70 of the central receiver 76.

The data-transmission modifying routine of FIG. 6, which is executed where the time interval of the transmission of the particular signal is relatively short, is substantially identical with the above-described data-transmission modifying routine of FIG. 5, except that the routine of FIG. 6 does not include the step S3. Since the time interval of the transmission of the particular signal is relatively short, the determination of step S1 can be made by checking if the reception of the particular signal is detected or not at a point of time of the implementation of step S1 in each cycle of execution of the routine. That is, unlike the routine of FIG. 5, the fact of the reception of the particular signal is not memorized in the RAM 39 of the tire-information generator 36.

The tire data sets 60, 100, transmitted from the transmitting antennas 34 provided in the tires 10, 12, are received by the receiving antenna 70 of the central receiver 76. Then, the received tire data sets 60, 100 are processed by the data processing device 74. There will be described a detection of abnormality of each of the tires 10, 12, which is carried out as one of the data processing operations. In the present embodiment, the radio communication between the local units 20 and the central unit 24 is maintained irrespective of whether the ignition switch 86 is in its ON state or OFF state, so that the tire data sets are transmitted to the central unit 24 during the OFF state of the ignition switch 86 as well as during the ON state of the ignition switch 86. However, the warning device 88 is not activated during the OFF state of the ignition switch 86, even if an abnormality of the tire state is detected. The warning device 88 is activated during the ON state of the ignition switch 86, if an abnormality of the tire state is detected, namely, if the air pressure represented by each tire data set is smaller than a predetermined minimum value and/or if the temperature represented by each tire data set is larger than a predetermined maximum value. It is noted that the tire data set transmitted from the spare tire 12 is processed in a manner different from a manner in which the tire data set transmitted from each mounted tire 10 is processed. For example, the predetermined minimum value of the air pressure and the predetermined maximum value of the temperature vary depending upon whether the tire in question is the mounted tire 10 or the spare tire 12.

Figure 9:
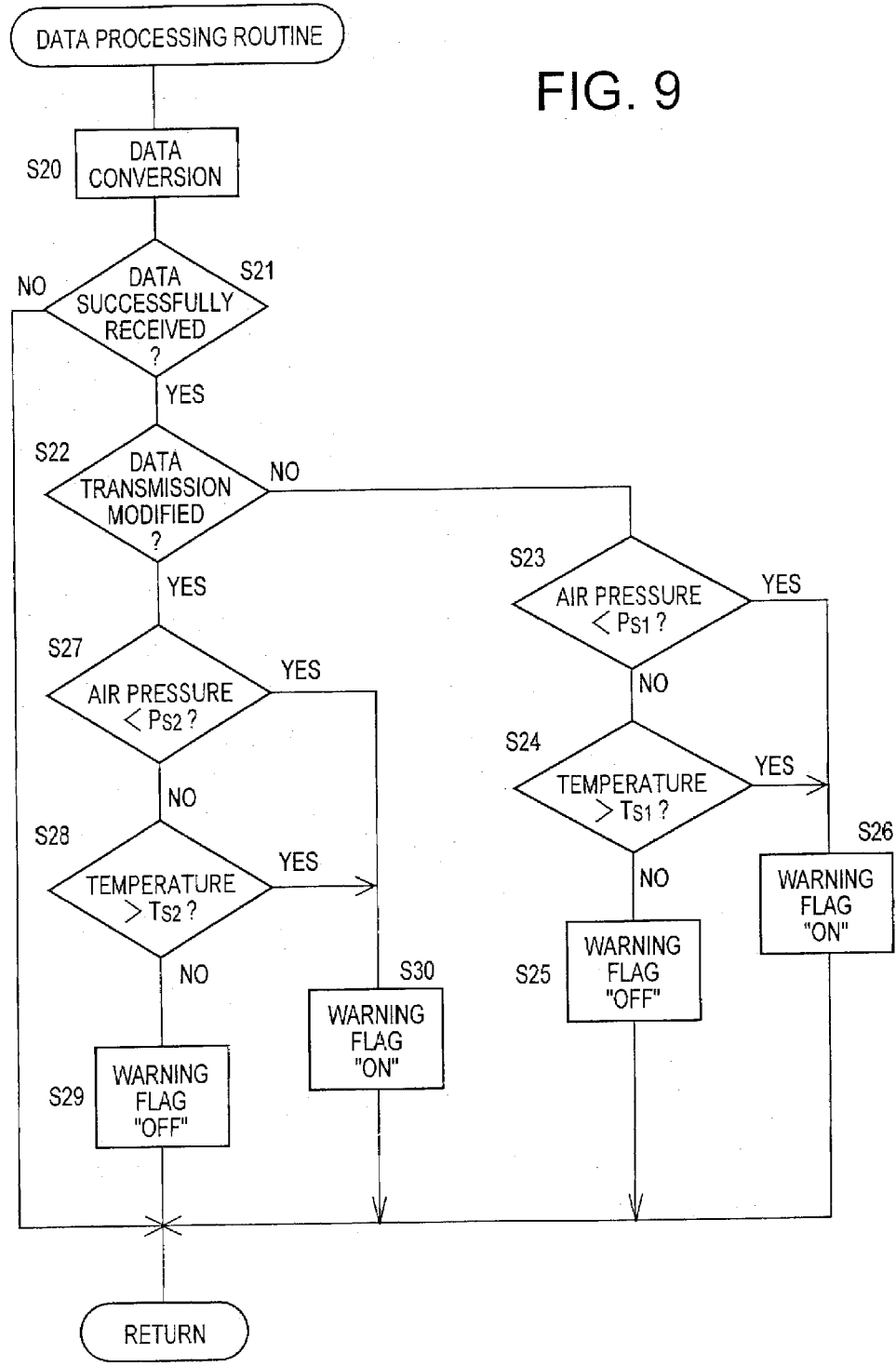
FIG. 9 is a flow chart illustrating a data processing routine executed according to a control program stored in a data storage of a central unit (provided on a body of the vehicle) of the detection/communication apparatus.

The data processing routine will be described by reference to the flow chart of FIG. 9. This data processing routine is executed at a predetermined time interval, and is initiated with step S20 in which the tire data set received by the receiving antenna 70 is converted into a form that can be processed by the computer of the data processing device 74. Step S20 is followed by step S21 which is implemented to determine whether the entirety of the tire data set as a unit of information has been successfully received by the receiving antenna 70 or not. If a negative decision is obtained in step S21, step S22 and the following steps are not implemented. If an affirmative decision is obtained in step S21, step S22 is implemented to determine whether the received tire data set has been transmitted from the spare tire 12, namely, whether the received tire data set is the spare-tire data set 100 (the modified data set) rather than the mounted-tire data set 60 (the non-modified data set). If the received tire data set is determined to have been transmitted from one of the mounted tire 10, a negative decision is obtained in step S22, whereby steps S23 and S24 are implemented to determine whether the tire state is abnormal or not, by seeing if the air pressure is lower than the predetermined minimum value $P_{S1}$, or not, and by seeing if the temperature is higher than the predetermined maximum value $T_{S1}$ or not. If the air pressure is not lower than the predetermined minimum value $P_{S1}$ while the temperature is not higher than the predetermined maximum value $T_{S1}$, the corresponding mounted tire 10 is determined to be normal, whereby step S25 is implemented to reset the warning flag (informing flag) to OFF. If the air pressure is lower than the predetermined minimum value $P_{S1}$, or if the temperature is higher than the predetermined maximum value $T_{S1}$, the mounted tire 10 is determined to be abnormal, whereby step S26 is implemented to set the warning flag to ON.

If the received tire data set is determined to have been transmitted from the spare tire 12, an affirmative decision is obtained in step S22, whereby steps S27 and S28 are implemented to determine whether the tire state is abnormal or not, by seeing if the air pressure is lower than the predetermined minimum value $P_{S2}$ or not, and by seeing if the temperature is higher than the predetermined maximum value $T_{S2}$ or not. The predetermined minimum value $P_{S2}$ and maximum value $T_{S2}$ are set to be lower than the above-described minimum value $P_{S1}$ and maximum value $T_{S1}$, respectively, which are employed to check the air pressure and the temperature of each mounted tire 10. The air pressure of each mounted tire 10, which is subjected to a weight of the vehicle and whose temperature is increased during running of the vehicle, tends to be higher than that of the spare tire 12. During running of the vehicle, the temperature of each mounted tire 10 is increased, for example, due to an elastic deformation of the tire occurred in a repeated manner and also to a friction acting between the tire and a road surface. However, the temperature of the mounted tire 10 is not increased to an unlimited extent, but is eventually held in constant after having being increased to a certain level. On the other hand, the temperature of the spare tire 12 is changed with change of a temperature in the luggage space in which the spare tire 12 is stored, but is changed at a relatively low rate. Further, since the temperature in the luggage space is not necessarily increased but can be reduced, the temperature of the spare tire 12 can be reduced when the temperature in the luggage space is reduced. Like the temperature of the mounted tire 10, the temperature of the spare tire 12 is eventually held in a certain level. The certain level of the temperature of the spare tire 12 is not as high as that of the temperature of the mounted tire 10. In view of these facts, the predetermined minimum value $P_{S2}$ and the predetermined maximum value $T_{S2}$ are set to be lower than the predetermined minimum value $P_{S1}$ and the predetermined maximum value $T_{S1}$, respectively.

If the air pressure is not lower than the predetermined minimum value $P_{S2}$ while the temperature is not higher than the predetermined maximum value $T_{S2}$, the spare tire 12 is determined to be normal, whereby step S29 is implemented to reset the warning flag (informing flag) to OFF. If the air pressure is lower than the predetermined minimum value $P_{S2}$, or if the temperature is higher than the predetermined maximum value $T_{S2}$, the spare tire 12 is determined to be abnormal, whereby step S30 is implemented to set the warning flag to ON. It is noted that the detection of the temperature of the spare tire 12 is not essential. Namely, the determination as to whether the spare tire 12 is normal or abnormal may be made only based on the air pressure of the spare tire 12.

Figure 10:
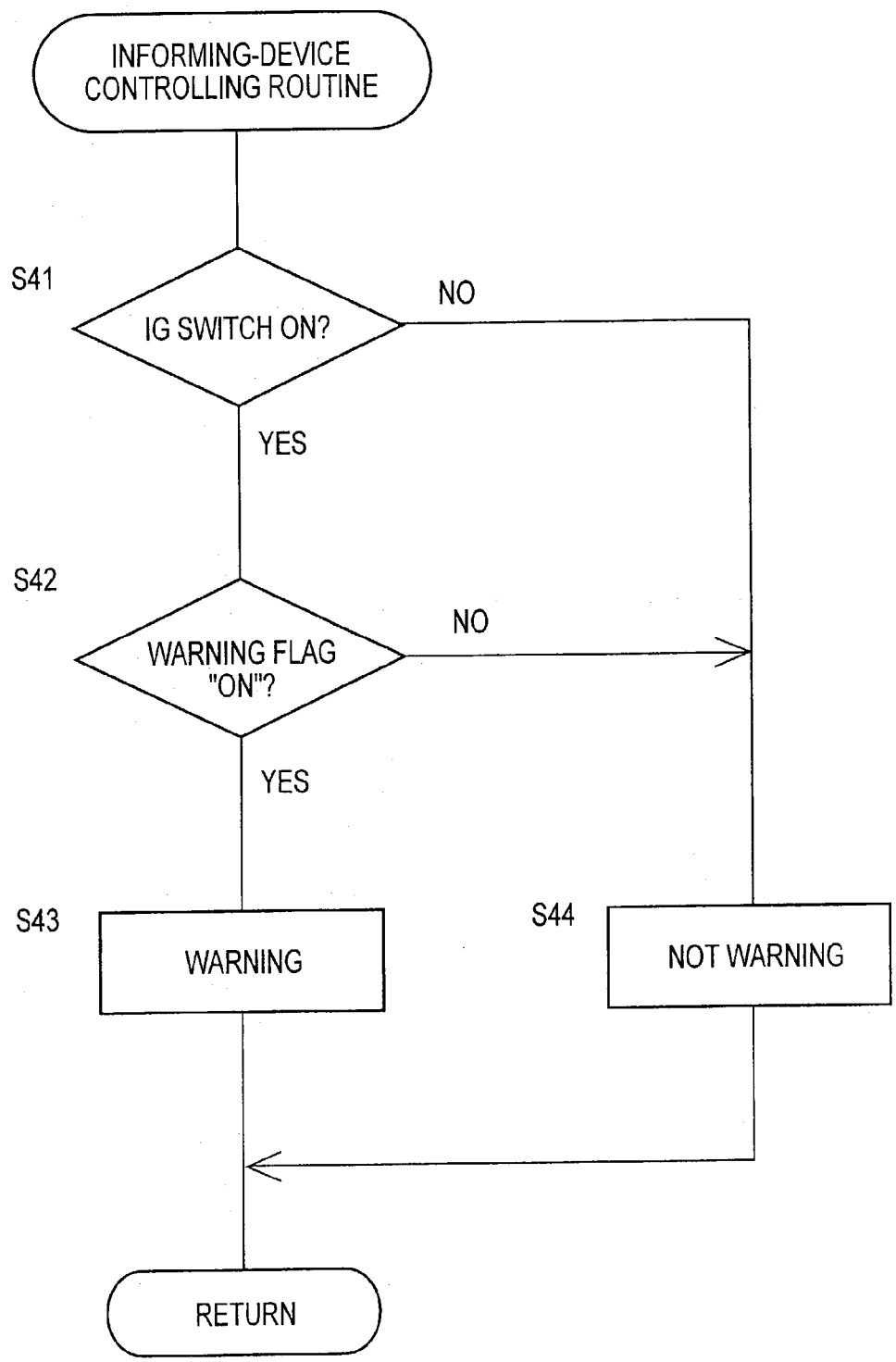
FIG. 10 is a flow chart illustrating an informing- device controlling routine executed according to a control program in the data storage of the above-described central unit.

The warning device 88 is controlled by executing the informing-device controlling routine illustrated by the flow chart of FIG. 10. This routine is initiated with step S41 to determine whether the ignition switch 86 is in its ON state. If an affirmative decision is obtained in step S41, step S42 is implemented to determine whether the warning flag is in its ON state. If an affirmative decision is obtained also in step S42, step S43 is implemented to activate the warning device 88 as an informing device. However, if a negative decision is obtained in at least one of steps S41, S42, the control flows goes to step S44 in which the warning device 88 is not activated. In this instance, if the warning device 88 is being activated, the activation of the warning device 88 is stopped in step S44. It is noted that the warning device 88 is not activated, even if the warning flag is set to ON, as long as the ignition switch 86 is held OFF.

The warning device 88 may be activated in a same manner irrespective whether the determination in step S42 relates to the mounted tire 10 or the spare tire 12. However, it is preferable that the warning device 88 is activated in one of different manners that is selected depending upon whether the determination relates to the mounted tire 10 or the spare tire 12. For example, where the warning device 88 is constituted by a sound emitter, the warning device 88 may be adapted to emit a smaller sound in the event of abnormality of the spare tire 12, than in the event of abnormality of the mounted tire 10. Further, the warning device 88 may be adapted to emit one of different music melodies that is selected depending upon whether the tire suffering from the abnormality is the mounted tire 10 or the spare tire 12. Where the warning device 88 is constituted by a display device, the warning device 88 may be adapted to display a message in one of its different portions that is selected depending upon whether the tire having the low air pressure is the mounted tire 10 or the spare tire 12. In either of these cases, the warning device 88 is activated when at least one of the tires 10, 12 suffers from the abnormality, such that the vehicle operator can know whether the tire suffering from the abnormality is the mounted tire 10 or the spare tire 12.

Further, the data processing routine may be provided with another warning flag (referred to as a second warning flag) in addition to the above-described warning flag (referred to as a first warning flag). The first warning flag is set to ON in step S26 when the mounted tire 10 is determined to be abnormal, while the second warning flag is set to ON in step S30 when the spare tire 12 is determined to be abnormal. In this modified arrangement, the warning device 88 is activated in one of the different manners that can be selected depending upon which one of the first and second warning flags is in ON state.

Further, the warning device 88 may include a plurality of indicators so that one of the indicators to be activated is selected differently depending upon whether the tire suffering from the abnormality is the mounted tire 10 or the spare tire 12.

In the present embodiment, each of non-mounted-tire-data transmission commanders (which are described in the mode (20) in the above "SUMMARY OF THE INVENTION") or each of data-transmission modifiers (which are described in the mode (1)) is constituted by portions of the corresponding local unit 20 which are assigned to store and execute the data-transmission modifying routine program illustrated by the flow chart of FIG. 5 or FIG. 6. A particular-signal-basis determining portion as an example of an information-basis determining portion of each of non-mounted tire detectors is constituted by portions of each local unit 20 which are assigned to store and implement steps S1–S7 of the data-transmission modifying routine program. A data-element content changer is constituted by portions of each local unit 20 which are assigned to store and implement steps S2, S5 and S6. A data-amount changer and a transmission-interval changer are constituted by portions of each local unit 20 which are assigned to store and implement step S6. A data processor is constituted by portions of the data processing device 74 of the central unit 24 which are assigned to store and execute the data processing routine program. A transmission-modification detecting portion is constituted by portions of the data processing device 74 of the central unit 24 which are assigned to store and implement step S22 of the data processing routine program. A reference-value changing portion as a processing modifying portion is constituted by portions of the data processing device 74 of the central unit 24 which are assigned to store and implement steps S27 and S28 of the data processing routine program. In the present embodiment, the above-described predetermined minimum value $P_{S1}$ and maximum value $T_{S1}$ serve as reference values of the mounted tire to be used for checking tire-state-related values in the form of the tire air pressure value and the tire temperature value of the mounted tire, while the above-described predetermined minimum value $P_{S2}$ and maximum value $T_{S2}$ serve as reference values of the non-mounted tire (different from the reference values of the mounted tire) to be used for checking tire-state-related values in the form of the tire air pressure value and the tire temperature value of the non-mounted tire.

Each of the air-pressure sensor 30, temperature sensor 32 and vibration sensor 33 serves as a tire state detector. Further, a tire-motion-basis determining portion as an example of a tire-state-basis determining portion of each of the non-mounted tire detectors is constituted by portions of each local unit 20 which are assigned to store and implement step S8 of the data-transmission modifying routine. The vibration sensor 33 serves as a tire-motion detector.

In the present embodiment, the tire in question is determined to be the spare tire 12, if the particular signal transmitted from the particular signal transmitter 82 is received by the corresponding local transceiver 52, and/or if the actual output value of the vibration sensor 33 is smaller than the predetermined value. The tire data set of the thus determined tire is modified as described above. Therefore, the tire data set of the spare tire 12 is distinguishable from the tire data set of each mounted tire 10, namely, the tire data set of the spare tire 12 is identifiable among the tire data sets received by the central receiver 76, without requiring the vehicle operator to perform a particular operation. Further, the detection of the abnormality of each of the tires 10, 12 can be carried out by employing a suitable reference value such as the above-described predetermined minimum value $P_{S1}$ or $P_{S2}$ and maximum value $T_{S2}$ or $T_{S2}$. The data amount of the spare-tire data set 100 is adapted to be smaller than that of the mounted-tire data set 60, and the time interval of the transmission of the spare-tire data set 100 is adapted to be longer than that of the transmission of the mounted-tire data set 60, for thereby making it possible to reduce consumption of an electric energy generated by a battery as a power source of the local unit 20. The reduction in the energy consumption leads to a prolonged service life of the battery. Further, since the air-pressure sensor 30, the temperature sensor 32, the vibration sensor 33, the tire-information generator 36 and other elements of the local unit 20 is fixed to each of the tires 10, 12, it is possible to improve a dynamic balance of each tire by suitably positioning the elements of the local unit 20 relative to one another, and also to prevent these elements of the local unit 20 from contributing to a vibration of the vehicle body. This is contrast to the above-described arrangement in which the transponder is freely moved within the air chamber of the tire, thereby causing the vibration of the vehicle body.

Each of the data-transmission modifiers does not necessarily include all of the above-described data-element content changer, data-amount changer and transmission-interval changer, but may include only one of them. For example, where the data-transmission modifier includes only the data-element content changer, the data amount of the determination data of each of the tire data sets may be 1 bit, so that the determination data of the non-mounted-tire data set is constituted by one of "1" and "0", while the determination data of the mounted-tire data set is constituted by the other of "1" and "0". In the central receiver which receives the tire data sets, the non-mounted-tire data set is identifiable among the received tire data sets, owing to the difference in the determination data.

In the present embodiment, it is checked if the particular signal has been received by each local transceiver 52, and also checked if the actual output value of the vibration sensor 33 is smaller than the predetermined value, for determining whether the corresponding tire is the spare tire 12 or one of the mounted tires 10. However, the determination may be made by only one of the two kinds of checks, so that one of the particular-signal transmitter 82 and the vibration sensor 33 may be omitted.

In the present embodiment, the data-transmission modifier provided in the spare tire 12 whose local transceiver 52 receives the particular signal is activated to modify the transmission of the corresponding tire data set, wherein the modification of the transmission of the tire data set includes: (1) changing the determination data (i.e., setting the determination data to "10" or "01") contained in the corresponding tire data set; (2) reducing the data amount of the corresponding tire data set; and (3) changing (increasing) the time interval of the transmission of the corresponding tire data set. The reduction of the data amount and the increase of the transmission time interval may be considered as kinds of a restriction of the transmission of the tire data set. That is, the modification of the transmission may be interpreted to include the restriction of the transmission.

Figure 11:
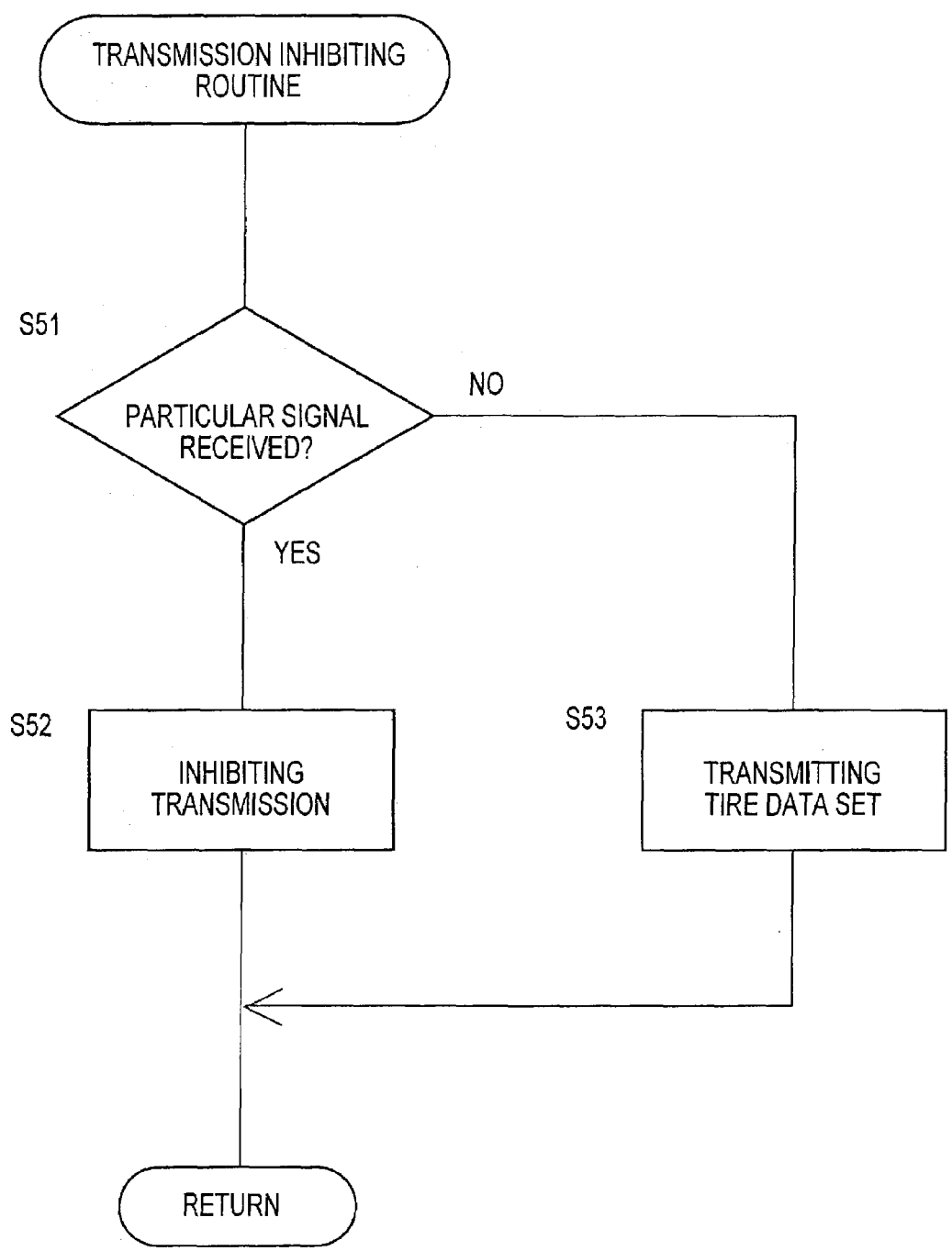
FIG. 11 is a flow chart illustrating another modification of the above-described data-transmission modifying routine.

The restriction of the transmission may be interpreted to include an inhibition of the transmission as its extreme form. FIG. 11 is a flow chart illustrating a transmission inhibiting routine which is initiated with step S51 to determine whether the particular signal has been received by the local transceiver 52. If an affirmative decision is obtained in step S51, the tire in question is determined to be the spare tire 12, whereby step S52 is implemented to inhibit the transmission of the tire data set from the tire in question. If a negative decision is obtained in step S51, the tire in question is determined to be one of the mounted tires 10, whereby step S53 is implemented to effect the transmission of the tire data set from the tire in question, so that the tire data set is received by the receiving antenna 70 of the central unit 24. That is, with the execution of the transmission inhibiting routine of FIG. 11, all of the tire data sets transmitted to the central unit 24 are those of the mounted tires 10. This arrangement is effective to prevent activation of the warning device or unnecessary control of the vehicle which is based on the tire-state-related value of the spare tire 12 such as its air pressure value and temperature value. Further, this arrangement makes it possible to reduce the consumption of the electric energy generated by the battery as the power source of the tire state detector (e.g., the sensors 30, 32, 33) and the tire-information generator 36. Moreover, since the tire data set of the spare tire 12 is not received by the central unit 24, the entire data amount to be processed by the data processor 74 can be advantageously reduced.

In the present embodiment, where one of the mounted tires 10 has been replaced with the spare tire 12, for example, in the event of a puncture of the mounted tire 10 or in a periodical tire replacement, it is determined that the spare tire 12 serves as a new mounted tire after the replacement. This determination can be made by seeing if a change amount of the temperature of the spare tire 12 within a predetermined length of time has been increased to a level corresponding to that of the temperature of the mounted tire, or if the voltage outputted by the vibration sensor 33 of the spare tire 12 has been increased to a level corresponding to that of the vibration sensor 33 of the mounted tire 10. If an affirmative decision is obtained in this determination, the inhibition of the transmission of the tire data set of the tire in question is cancelled, whereby the transmission of the tire data set of the newly mounted tire is initiated.

Figure 12:
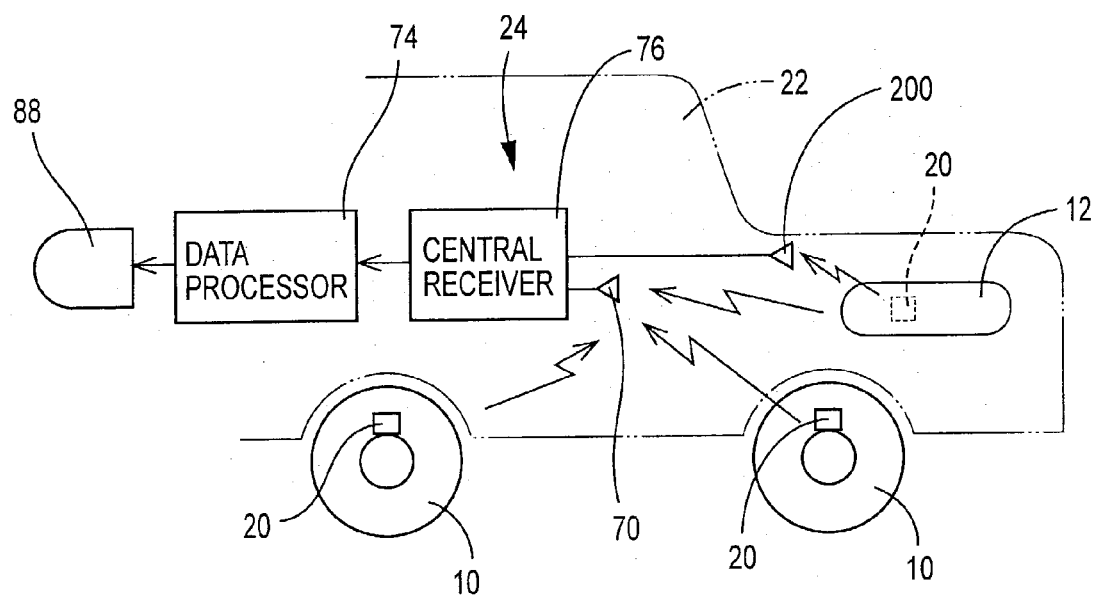
FIG. 12 is a schematic view showing a vehicle equipped with a detection/communication apparatus which is constructed according to another embodiment of the invention.

FIG. 12 is a schematic view showing a vehicle equipped with a detection/communication apparatus which is constructed according to another embodiment of the invention. While the detection/communication apparatus of the above-described embodiment of the invention is provided with the single receiving antenna 70 which is common to the mounted tires 10 and the spare tire 12, the apparatus of this embodiment of the invention is provided with another receiving antenna (non-mounted-tire-signal receiving antenna) 200 in addition to the antenna 70. A sensitivity and/or a directivity of this receiving antenna 200 are adjusted in such a manner that enables the receiving antenna 200 to receive a signal transmitted from the transmitting antenna 34 of the spare tire 12 and that disables the receiving antenna 200 to receive a signal transmitted from the transmitting antenna 34 of each of the mounted tires 10. In the apparatus of the present embodiment, each of the local units 20 is not provided with the vibration sensor 33 and the receiving antenna 44, while the central unit 24 is not provided with the particular-signal transmitter 82. In the arrangement of the present embodiment of the invention, the tire data set received by the receiving antenna 200 can be determined to be the tire data set transmitted from the spare tire 12, so that the tire data set of the spare tire 12 is distinguishable from the tire data sets of the mounted tires 10. The tire data set received by the receiving antenna 200 is processed in a manner different from a manner in which the other tire data sets are processed. It is noted that the apparatus may be provided with a plurality of receiving antennas each of which is arranged to receive the signal transmitted from the corresponding one of the mounted tires 10.

There is a case where a T-type tire known as a "Tempa Tire" (trademark) is carried as a non-mounted tire or spare tire by the vehicle. The T-type tire is a kind of temporary tire which is mounted on the axle of the vehicle only in case of emergency, and has smaller section width and overall diameter than those of a regular tire in the interest of reducing its weight and a space required for the storage. The air pressure of the T-type tire is adapted to be higher than that of the regular tire, for thereby compensating the difference between the overall diameter of the T-type tire and that of the regular tire, so as to assure a stability in steering the vehicle. Where a desired value of the air pressure of the regular tire is about 2.0 kpa, for example, a desired value of the air pressure of the T-type tire is about 4.0 kpa (two times as high as that of the regular tire).

Figure 13:
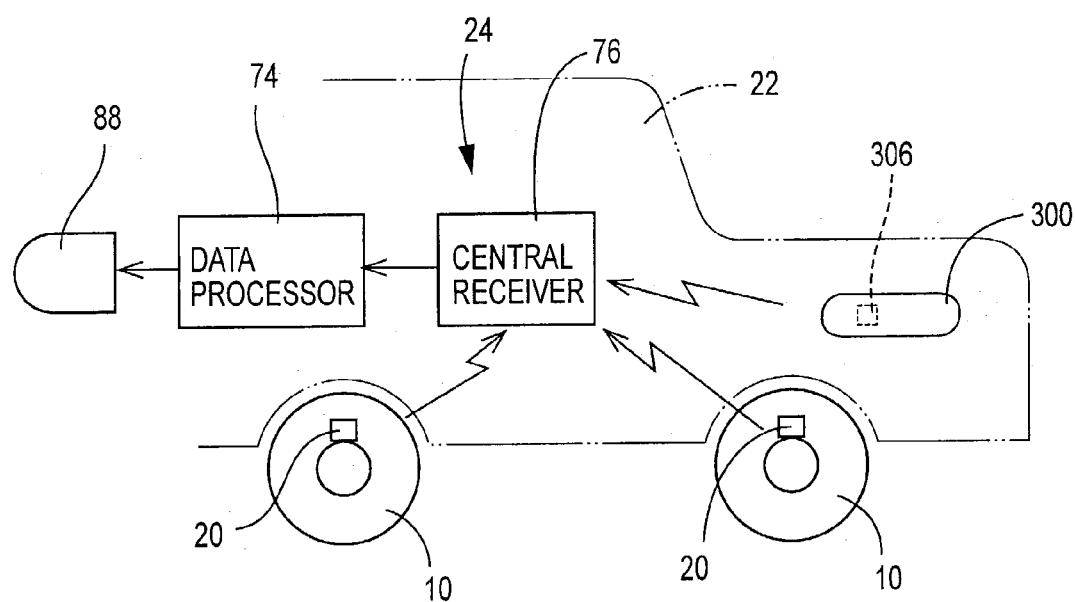
FIG. 13 is a schematic view showing a vehicle equipped with a detection/communication apparatus which is constructed according to still another embodiment of the invention.
Figure 14:
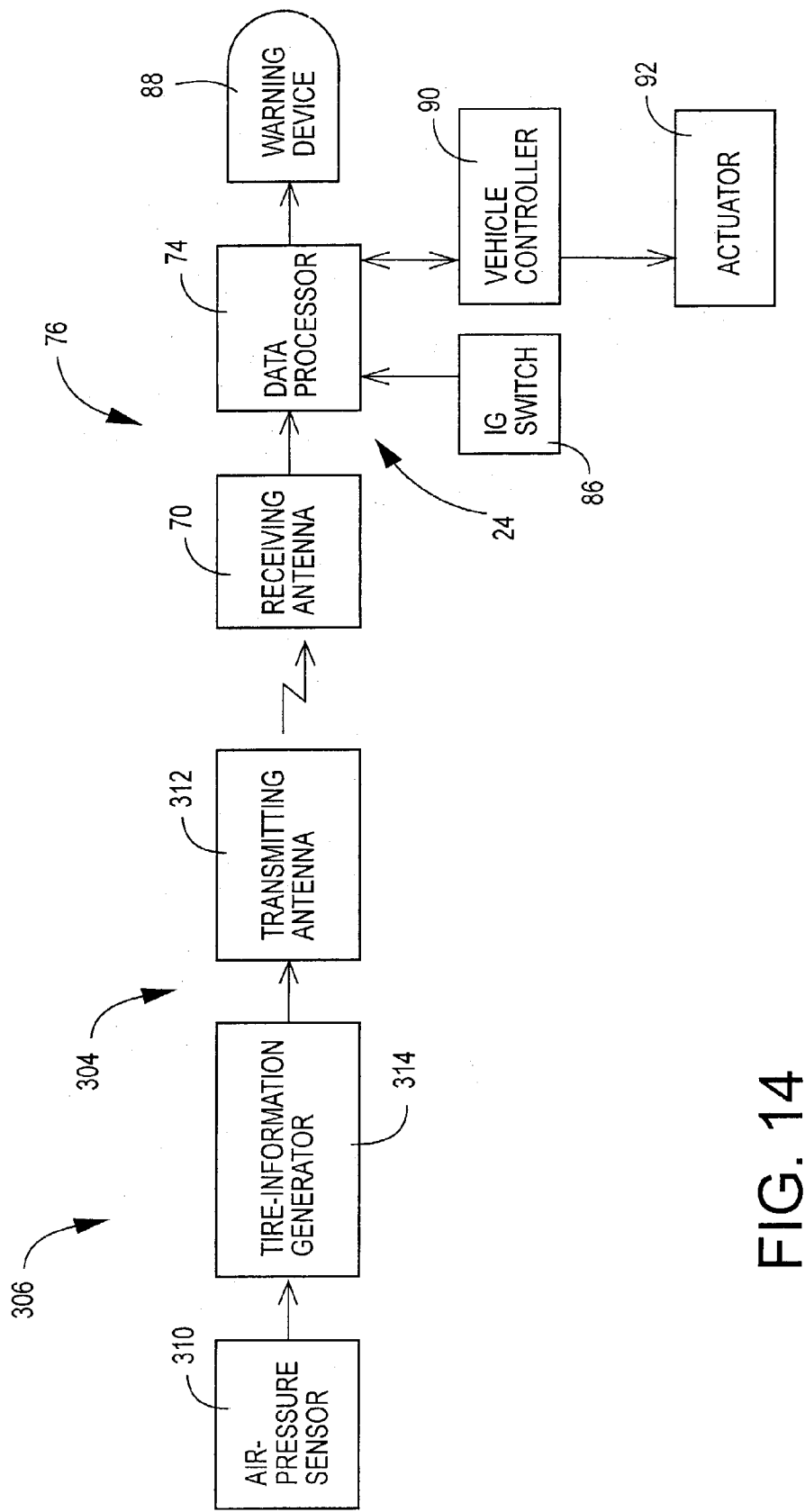
FIG. 14 is a block diagram showing the detection/ communication apparatus of FIG.

Referring next to FIGS. 13–16, there will be described a detection/communication apparatus which is constructed according to a still another embodiment of the invention. The same reference signs as used in the above-described embodiments will be used in this embodiment, to identify the corresponding elements, which will not be described in detail. In the apparatus of this embodiment which is designed for a case where a T-type tire 300 is carried as a spare tire by the vehicle, each of the local units 20 is not provided with the vibration sensor 33 and the receiving antenna 44, while the central unit 24 is not provided with the particular-signal transmitter 82. As shown in FIGS. 13 and 14, a local unit 306 including a transmitter 304 is provided in the T-type tire 300. This local unit 306 is designed exclusively for a T-type tire, and has a construction simpler than that of each of the above-described local units 20 provided in the regular tires 10, 12. The local unit 306 includes an air pressure detector in the form of an air pressure sensor 310 for detecting the air pressure of the T-type tire 300; a transmitting antenna 312 for transmitting tire information in the form of a T-type-tire data set which includes an air pressure data representing the detected air pressure of the corresponding tire; and a tire information generator 314 for generating the T-type-tire data set. The transmitting antenna 312 and the tire information generator 314 constitute a major portion of the transmitter 304. The tire information generator 314 is constituted principally by a computer including a CPU, a ROM, a RAM and input and output portions. To the input portion, there is connected the air pressure sensor 310. To the output portion, there is connected the transmitting antenna 312.

Figure 15:
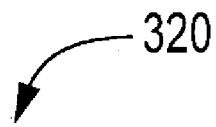
FIG. 15 is a view illustrating tire information in the form of a T-type-tire data set.
Figure 16:
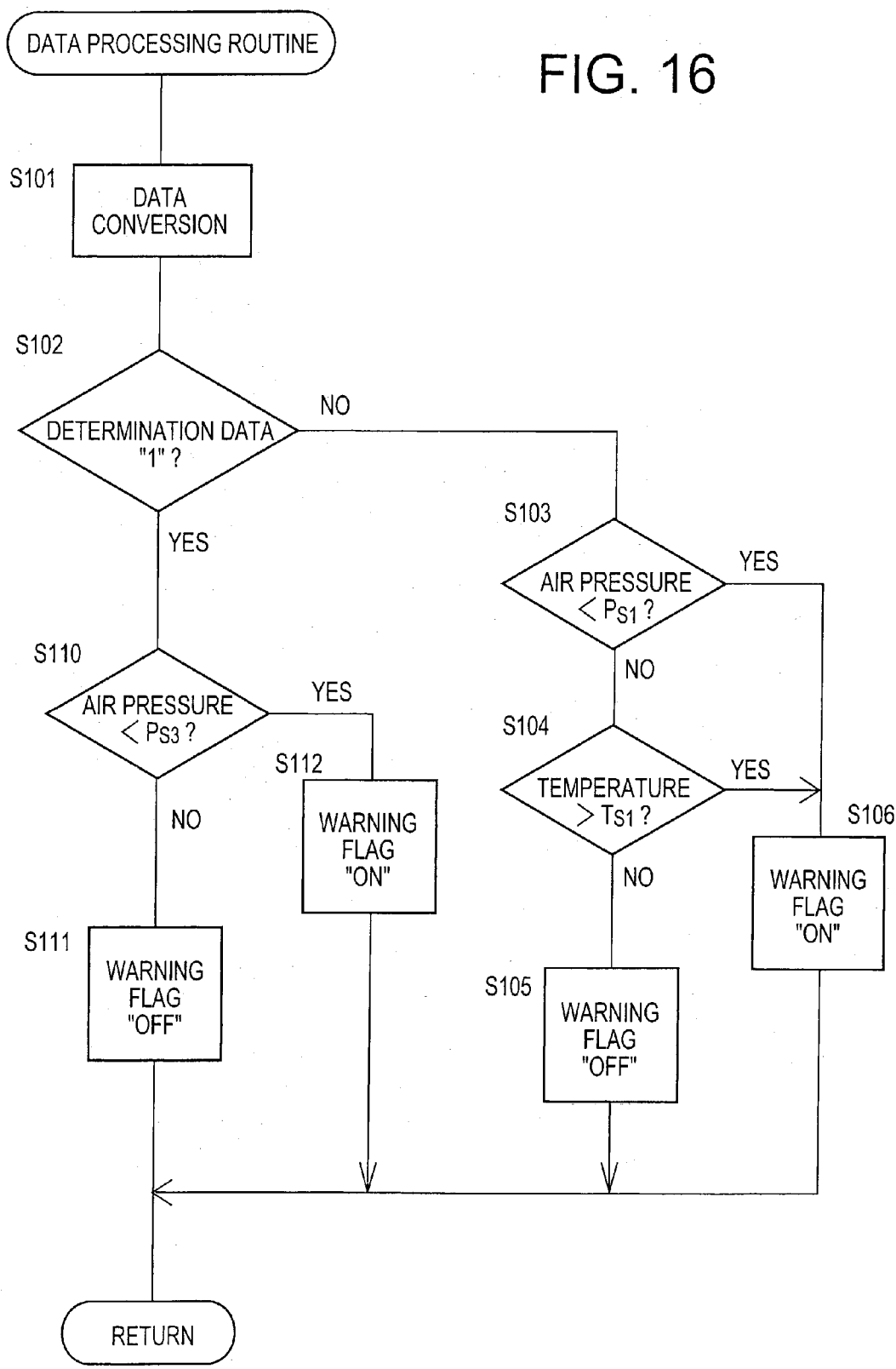
FIG. 16 is a flow chart illustrating a data processing routine executed according to a control program stored in a ROM of a data processor of a central unit provided on a body of the vehicle, which central unit is included in the detection/communication apparatus of FIG. 13.

The T-type-tire data set 320 generated by the tire information generator 314 includes (a) a header data, (b) a synchronization data, (c) an identification data, (d) a battery voltage data, (f) an air pressure data and (k) a T-type tire determination data, as shown in FIG. 15. The tire data set generated by the information generator of each local unit 20 is identical with the above-described mounted-tire data set 60, except that the determination data is replaced with the T-type tire determination data. The data amount of the T-type tire determination data of each of the tire data sets is 1 bit, so that the T-type tire determination data is constituted by "1" where the corresponding tire is the T-type tire 300, while the T-type tire determination data is constituted by "0" where the corresponding tire is one of the regular tires 10. Since the T-type tire 300 is used as a mounted tire only in case of emergency in which one of the regular tires 10 becomes unserviceable, the vehicle is commonly driven at a low speed when the T-type tire 300 is used as the mounted tire. During running of the vehicle at a low speed, it is difficult to detect an abnormality of the tire by seeing a temperature of the tire or a change of the tire temperature. In view of this, a temperature sensor is not provided in the local unit 306. The absence of the temperature sensor leads to a reduction of consumption of an electric energy generated by a battery as a power source of the local unit 306.

The T-type-tire data set 320, transmitted from the T-type tire 300 to the central receiver 76, is processed in a manner different from a manner in which the tire data sets transmitted from the regular tires 10 are processed. The data processing routine of the present embodiment will be described by reference to the flow chart of FIG. 16. This data processing routine is initiated with step S101 in which the received tire data set is converted into a processable form. Step S101 is followed by step S102 which is implemented to determine whether the determination data is constituted by "1" or not. If the tire data set is one of the tire data sets transmitted from the respective regular tires 10 rather than the T-type-tire data set 320 transmitted from the T-type tire 300, a negative decision is obtained in step S102, whereby steps S103 and S104 are implemented to determine whether the state of the corresponding regular tire is normal or abnormal in the same manner as in the above-described embodiments. That is, the determination is made by seeing if the air pressure is lower than the predetermined minimum value $P_{S1}$ and also by seeing if the tire temperature is higher than the predetermined maximum value $T_{S1}$. If the air pressure is not lower than the predetermined minimum value $P_{S1}$ while the tire temperature is not higher than the predetermined maximum value $T_{S1}$, it is determined that the corresponding regular tire is normal, whereby step S105 is implemented to reset a warning flag (informing flag) to OFF. If the air pressure is lower than the predetermined minimum value $P_{S1}$, or if the temperature is higher than the predetermined maximum value $T_{S1}$, it is determined that the corresponding regular tire is abnormal, whereby step S106 is implemented to set the warning flag to ON.

If the tire data set is the T-type-tire data set 320 transmitted from the T-type tire 300, an affirmative decision is obtained in step S102 since the determination data of the tire date set in question is constituted by "1". The affirmative decision in step S102 is followed by step S110 to determine whether the corresponding tire (the T-type tire 300) is normal or abnormal in its state, by seeing if the air pressure is smaller than a predetermined minimum value $P_{S3}$. Since the air pressure of the T-type tire 300 should be higher than that of each regular tire 10, as described above, the predetermined minimum value $P_{S3}$ serving as a reference value for checking the air pressure of the T-type tire 300 is higher than the above-described minimum value $P_{S1}$ used for checking the air pressure of each regular tire 10. If the air pressure of the tire 300 is not lower than the predetermined minimum value $P_{S3}$, the tire 300 is determined to be normal, whereby step Sill is implemented to reset a warning flag to OFF. If the air pressure of the tire 300 is lower than the predetermined minimum value $P_{S3}$, the tire 300 is determined to be abnormal, whereby step S112 is implemented to set the warning flag to ON. This warning flag (which is reset to OFF and set to ON in respective steps S111 and S 112) and the above-described warning flag (which is reset to OFF and set to ON in respective steps S105 and S106) may be provided by the same warning flag. However, it is preferable that the warning flags are respectively provided by first and second warning flags which are different from each other. In this arrangement, the warning device 88 is activated in one of the different manners that can be selected depending upon which one of the first and second warning flags is in ON state.

In the present embodiment, the air pressure sensor 310 constitutes a temporary-tire state detector which detects a tire air pressure as a tire-state-related value of the T-type tire 300, while the air pressure sensor 30 and the temperature sensor 32 constitutes a regular-tire state detector which detects a tire air pressure and a tire temperature as tire-state-related values of each of the regular tires 10. The transmitter 50 provided in each of the regular tires 10 constitutes a regular-tire data transmitter, while the transmitter 304 provided in the T-type tire 300 constitutes a temporary-tire data transmitter. A data processor is constituted by portions of the data processing device 74 which are assigned to store and execute the data processing routine program. The predetermined minimum value $P_{S1}$ (which is compared with the air pressure value of the regular tire 10 in step S103 of the data processing routine) constitutes a first minimum value, while the predetermined minimum value $P_{S3}$ (which is compared with the air pressure value of the T-type tire 300 in step S110 of the data processing routine) constitutes a second minimum value. An air-pressure abnormality detector is constituted by portions of the data processing device 74 of the central unit 24 which are assigned to store and implement steps S110 and S112 of the data processing routine program.

In the present embodiment, the air pressure of the T-type tire 300 is monitored, so that the warning device 88 can be activated when an abnormality of the T-type tire 300 is detected. The local unit 306 provided in the T-type tire 300 is made relatively simple in construction, whereby the consumption of the electric energy generated by the battery as the power unit of the local unit 306 can be reduced. Further, in the present embodiment in which the T-type-tire data set 320 is constituted by a minimized number of data elements required for representing a normality or abnormality of the T-type tire 300, the content of the data element of the tire data set 320 does not have to be changed irrespective of whether the T-type tire 300 is used as the mounted tire or non-mounted tire, unlike the above-described embodiments.

In the embodiments described above, the air pressure sensor 30 or 310 is fixed to a portion of the wheel which portion faces an inlet valve of the tire. However, the air pressure sensor 30, 310 may be built in the tire per se, disposed in an inner space (air chamber) of the tire, or provided in a bead portion, a sidewall portion or a tread portion of the tire.

While the presently preferred embodiments of the invention have been described above in detail by reference to the accompanying drawings, for illustrative purpose only, it is to be understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A detection/communication apparatus to be installed on a vehicle having a plurality of tires, said apparatus comprising:

tire state detectors which are provided on the respective tires and each of which detects a state of a corresponding one of said tires;

local transceivers which are provided on the respective tires and which transmit tire data sets relating to the respective tires, each of said tire data sets including at least one tire-state data element representative of the detected state of a corresponding one of said tires;

a central receiver which is provided on a body of the vehicle and which receives said tire data sets transmitted by said local transceivers;

a particular-signal transmitter which is provided on the body of the vehicle and which transmits a particular-signal; and data-transmission modifiers which are provided on the respective tires, each of said data-transmission modifiers being operable depending upon a state of reception of said particular-signal by a corresponding one of said local transceivers, to modify transmission of a corresponding one of said tire data sets by said corresponding one of said local transceivers, wherein each data-transmission modifier includes at least one of a transmission restrictor, a data-element content changer, a data-amount changer and a transmission-interval changer.

2. A detection/communication apparatus according to claim 1, wherein said particular-signal transmitter transmits said particular-signal such that said particular-signal is receivable by one of said local transceivers that is provided on a selected one of the tires, while said particular-signal is unreceivable by the other of said local transceivers, and wherein a corresponding one of said data- transmission modifiers which is provided on said selected one of the tires is operated in response to reception of said particular-signal by said one of said local transceivers, to modify transmission of a corresponding one of said tire data sets by said one of said local transceivers.

3. A detection/communication apparatus according to claim 1, wherein each of said data-transmission modifiers includes a transmission restrictor operable to restrict transmission of said corresponding one of said tire data sets by said corresponding one of said local transceivers.

4. A detection/communication apparatus according to claim 1, wherein each of said data-transmission modifiers includes a data-element content changer operable to change a content of a data element included in said corresponding one of said tire data sets that is transmitted by said corresponding one of said local transceiver, such that the changed content of said data element included in said corresponding one of said tire data sets is different from that of said data element included in the other of said tire data sets.

5. A detection/communication apparatus according to claim 1, wherein each of said data-transmission modifier includes a data-amount changer operable to change a data amount of said corresponding one of said tire data sets that is transmitted by said corresponding one of said local transceivers, such that the changed data amount of said corresponding one of said tire data sets is different from that of the other of said tire data sets.

6. A detection/communication apparatus according to claim 1, wherein each of said data-transmission modifiers includes a transmission-interval changer operable to change a time interval at which said corresponding one of said tire data sets is transmitted by said corresponding one of said local transceivers, such that the changed time interval is different from a time interval of transmission of the other of said tire data sets.

7. A detection/communication apparatus according to claim 1, further comprising:
a data processor which is provided on the body of the vehicle and which is capable of determining whether the transmission of each of said tire data sets has been modified or not, so that said data processor can process said each of said tire data sets in one of different processing manners that is selected depending upon whether the transmission of said each of said tire data sets has been modified or not.

8. A detection/communication apparatus according to claim 7, wherein said data processor includes a reference-value changing portion which changes a reference value to be used for checking a tire-state-related value represented by each of said at least one tire-state data element of said corresponding one of said tire data sets whose transmission has been modified, such that the changed reference value is different from a reference value to be used for checking a tire-state-related value represented by each of said at least one tire-state data element of the other of said tire data sets whose transmission has not been modified.

9. A detection/communication apparatus according to claim 1,
wherein the plurality of tires of the vehicle includes a mounted tire mounted on an axle of the vehicle and a non-mounted tire carried by the vehicle,
and wherein said particular-signal transmitter transmits said particular-signal such that said particular-signal is receivable by one of said local transceivers that is provided on said non-mounted tire while said particular-signal is unreceivable by one of said local transceivers that is provided on said mounted tire.

10. A detection/communication apparatus according to claim 9,
wherein said particular-signal transmitter includes a transmitting antenna by which said particular-signal is transmitted,
and wherein said transmitting antenna has at least one of an output strength and a directivity which enables said particular-signal to be received by said one of said local transceivers provided on said non-mounted tire, and which disables said particular-signal to be received by said one of said local transceivers provided on said mounted tire.

11. A detection/communication apparatus according to claim 1, wherein said local transceivers transmit said tire data sets at respective time intervals different from each other.

12. A detection/communication apparatus according to claim 1,
wherein said particular-signal transmitter is disposed in a relative position relative to a space in which one of the plurality of tires is to be stored as a non-mounted tire,
and wherein said relative position enables said particular-signal transmitted by said particular-signal transmitter, to be received by one of said local transceivers that is provided on the non-mounted tire stored in the space, while disenabling said particular-signal from being received by one of said local transceivers that is provided on one of the plurality of tires mounted as a mounted tire on an axle of the vehicle.

13. A detection/communication apparatus to be installed on a vehicle having a plurality of tires which include a mounted tire mounted on an axle of the vehicle and a non-mounted tire carried by the vehicle, said apparatus comprising:
tire state detectors which are provided on the respective tires and each of which detects a state of a corresponding one of said tires;
local transceivers which are provided on the respective tires and which transmit tire data sets relating to the respective tires, each of said tire data sets including at least one tire-state data element representative of the detected state of a corresponding one of said tires;
a central receiver which is provided on a body of the vehicle and which receives said tire data sets transmitted by said local transceivers;
non-mounted-tire detectors which are provided on the respective tires and each of which effects a determination as to whether a corresponding one of the tires is said non-mounted tire or not; and
data-transmission modifiers which are provided on the respective tires, each of said data-transmission modifiers being operable in response to an affirmative decision by a corresponding one of said non-mounted-tire detectors in said determination, to modify transmission of a corresponding one of said tire data sets to said central receiver.

14. A detection/communication apparatus according to claim 13, wherein each of said non-mounted tire detectors includes an information-basis detecting portion which effects said determination on the basis of information received by a corresponding one of said local transceivers.

15. A detection/communication apparatus according to claim 14, further comprising:
a particular-signal transmitter which is provided on the body of the vehicle and which transmits a particular-signal,
wherein said information-basis determining portion includes a particular-signal-basis determining portion which determines that said corresponding one of the tires is said non-mounted tire if said particular-signal is received by said corresponding one of said local transceivers.

16. A detection/communication apparatus according to claim 13, wherein each of said non-mounted tire detectors includes a tire-state-basis determining portion which effects said determination on the basis of the state of said corresponding one of the tires.

17. A detection/communication apparatus according to claim 16,
wherein each of said tire state detectors includes a tire-motion detector which detects a motion of a corresponding one of said tires,
and wherein said tire-state-basis determining portion includes a tire-motion-basis determining portion which effects said determination on the basis of the detected motion of said corresponding one of the tires.

18. A detection/communication apparatus to be installed on a vehicle having a plurality of tires which include a mounted tire mounted on an axle of the vehicle and a non-mounted tire carried by the vehicle, said apparatus comprising:
   tire state detectors which are provided on the respective tires and each of which detects a state of a corresponding one of said tires;
   local transceivers which are provided on the respective tires; and
   a central receiver which is provided on a body of the vehicle and which includes a non-mounted-tire-signal receiving antenna,
   wherein said non-mounted-tire-signal receiving antenna has at least one of a sensitivity and a directivity which enables said receiving antenna to receive a signal transmitted from one of said local transceivers provided on said non-mounted tire, and which disables said receiving antenna to receive a signal transmitted from one of said local transceivers provided on said mounted tire.

19. A detection/communication apparatus to be installed on a vehicle having a plurality of tires which include a regular tire and a temporary tire, said apparatus comprising:
   a regular-tire state detector which is provided on said regular tire and which detects a state of said regular tire;
   a temporary-tire state detector which is provided on said temporary tire and which detects a state of said temporary tire;
   a regular-tire data transmitter which is provided on said regular tire and which transmits a regular-tire data set relating to said regular tire, said regular-tire data set including at least one regular-tire-state data element representative of the detected state of said regular tire;
   a temporary-tire data transmitter which is provided on said temporary tire and which transmits a temporary-tire data set relating to said temporary tire, said temporary-tire data set including at least one temporary-tire-state data element representative of the detected state of said temporary tire, and having a data amount smaller than that of said regular-tire data set;
   a central receiver which is provided on a body of the vehicle and which receives said regular-tire data set and said temporary-tire data set transmitted by said regular-tire data transmitter and said temporary-tire data transmitter, respectively; and
   a data processor which processes said regular-tire data set in a regular-tire data processing manner and which processes said temporary-tire data set in a temporary-tire data processing manner that is different from said regular-tire data processing manner.

20. A detection/communication apparatus according to claim 19,
   wherein said at least one regular-tire data element of said regular-tire data set includes a data element representative of an air pressure value of said regular tire detected by said regular-tire state detector while said at least one temporary-tire data element of said temporary-tire data set includes a data element representative of an air pressure value of said temporary tire detected by said temporary-tire state detector,
   and wherein said data processor includes an air-pressure abnormality detector which detects an abnormality of said air pressure value of said regular tire, by checking if said air pressure value of said regular tire is lower than a first minimum value, and which detects an abnormality of said air pressure value of said temporary tire, by checking if said air pressure value of said temporary tire is lower than a second minimum value that is higher than said first minimum value.

21. A communication apparatus to be installed on a vehicle having a plurality of tires which include a mounted tire mounted on an axle of the vehicle and a non-mounted tire carried by the vehicle, said apparatus comprising:
   local transceivers which are provided on the respective tires and which transmit tire data sets relating to the respective tires;
   a central receiver which is provided on a body of the vehicle;
   a particular-signal transmitter which is provided on the body of the vehicle and which transmits a particular-signal; and
   non-mounted-tire-data transmission commanders which are provided on the respective tires, each of said non-mounted-tire-data transmission commanders being operable depending upon a state of reception of said particular-signal by a corresponding one of said local transceivers, to command said corresponding one of said local transceivers to transmit a corresponding one of said tire data sets as a non-mounted-tire data set relating to said non-mounted tire, wherein each non-mounted-tire-data transmission commanders includes at least one of a transmission restrictor, a data-element content changer, a data-amount changer and a transmission-interval changer.

22. A communication apparatus according to claim 21, further comprising:
   data-transmission modifiers which are provided on the respective tires, each of said data-transmission modifiers being operable together with a corresponding one of said transmission commanders, to modify transmission of said corresponding one of said tire data sets by said corresponding one of said local transceivers.

23. A communication apparatus according to claim 21,
   wherein said particular-signal transmitter is disposed in a relative position relative to a space in which one of the plurality of tires is to be stored as a non-mounted tire,
   and wherein said relative position enables said particular-signal transmitted by said particular-signal transmitter, to be received by one of said local transceivers that is provided on the non-mounted tire stored in the space, while disenabling said particular-signal from being received by one of said local transceivers that is provided on one of the plurality of tires mounted as a mounted tire on an axle of the vehicle.

* * * * *